(12) United States Patent
Cayemberg et al.

(10) Patent No.: US 10,402,360 B2
(45) Date of Patent: Sep. 3, 2019

(54) BUILDING MANAGEMENT SYSTEM WITH AUTOMATIC EQUIPMENT DISCOVERY AND EQUIPMENT MODEL DISTRIBUTION

(71) Applicant: Johnson Controls Technology Company, Plymouth, MI (US)

(72) Inventors: Jennifer S. Cayemberg, Racine, WI (US); Lisa E. Strand, Wauwatosa, WI (US); Ryan J. Bykowski, South Milwaukee, WI (US); Daniel R. Gottschalk, Racine, WI (US); Eric W. Hamber, New Berlin, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 235 days.

(21) Appl. No.: 15/179,894

(22) Filed: Jun. 10, 2016

(65) Prior Publication Data
US 2017/0357607 A1     Dec. 14, 2017

(51) Int. Cl.
| | |
|---|---|
| *G06F 13/362* | (2006.01) |
| *G06F 13/42* | (2006.01) |
| *H04L 12/28* | (2006.01) |
| *H04L 12/24* | (2006.01) |
| *G05B 15/02* | (2006.01) |

(52) U.S. Cl.
CPC ......... *G06F 13/4208* (2013.01); *G05B 15/02* (2013.01); *G06F 13/362* (2013.01); *H04L 12/2816* (2013.01); *H04L 41/0809* (2013.01); *G05B 2219/163* (2013.01); *G05B 2219/25011* (2013.01); *G05B 2219/2642* (2013.01); *H04L 12/2809* (2013.01)

(58) Field of Classification Search
CPC ............ G05B 15/02; G05B 2219/2642; G05B 2219/2614; H04L 67/12; H04L 12/2816
USPC ........................................................ 710/105
See application file for complete search history.

(56) References Cited

U.S. PATENT DOCUMENTS

| | | | | |
|---|---|---|---|---|
| 4,747,100 | A | * | 5/1988 | Roach .................. H04L 12/417 370/452 |
| 4,949,337 | A | * | 8/1990 | Aggers ................. H04L 12/417 370/451 |

(Continued)

OTHER PUBLICATIONS

Johnson Controls, Commercial Comfort System (CCS) Product Bulletin, Jun. 16, 2015, 23 pages.
(Continued)

*Primary Examiner* — Titus Wong
(74) *Attorney, Agent, or Firm* — Foley & Lardner LLP

(57) ABSTRACT

A building management system including a system manager, a zone coordinator, and one or more zone controllers configured to monitor and control building zones. The system manager includes a system bus datalink having an active node table stored therein. The zone coordinator includes a second system bus datalink and a zone bus datalink. A system bus connects the first system bus datalink to the second system bus datalink. A zone bus connects the zone bus datalink to the one or more zone controllers. The active node table includes a plurality of nodes, each node representing a system bus device communicating on the system bus. The system manager is configured to monitor the active node table for new nodes and to identify a new system bus device communicating on the system bus in response to a determination that the active node table includes a new node.

20 Claims, 8 Drawing Sheets

(56) References Cited

U.S. PATENT DOCUMENTS

| | | | | |
|---|---|---|---|---|
| 6,400,103 B1* | 6/2002 | Adamson | H04L 12/2803 | 315/292 |
| 6,487,457 B1* | 11/2002 | Hull | G05B 15/02 | 700/17 |
| 6,639,917 B1* | 10/2003 | Ellington, Jr. | H04L 12/46 | 370/401 |
| 2009/0287736 A1* | 11/2009 | Shike | H04L 12/417 | |
| 2010/0114383 A1* | 5/2010 | Rosca | H04L 67/12 | 700/276 |
| 2013/0086066 A1* | 4/2013 | Anderson, Jr. | H04L 12/2807 | 707/737 |
| 2013/0238795 A1* | 9/2013 | Geffin | G06F 1/206 | 709/224 |
| 2014/0072059 A1 | 3/2014 | Krishnan et al. | | |
| 2015/0293508 A1* | 10/2015 | Piaskowski | G05B 15/02 | 700/275 |

OTHER PUBLICATIONS

Search Report for International Application No. PCT/US2017/030909, dated Aug. 11, 2017, 15 pages.

PCT International Preliminary Report and Written Opinion on 112444-0465 dated Dec. 20, 2018.

* cited by examiner

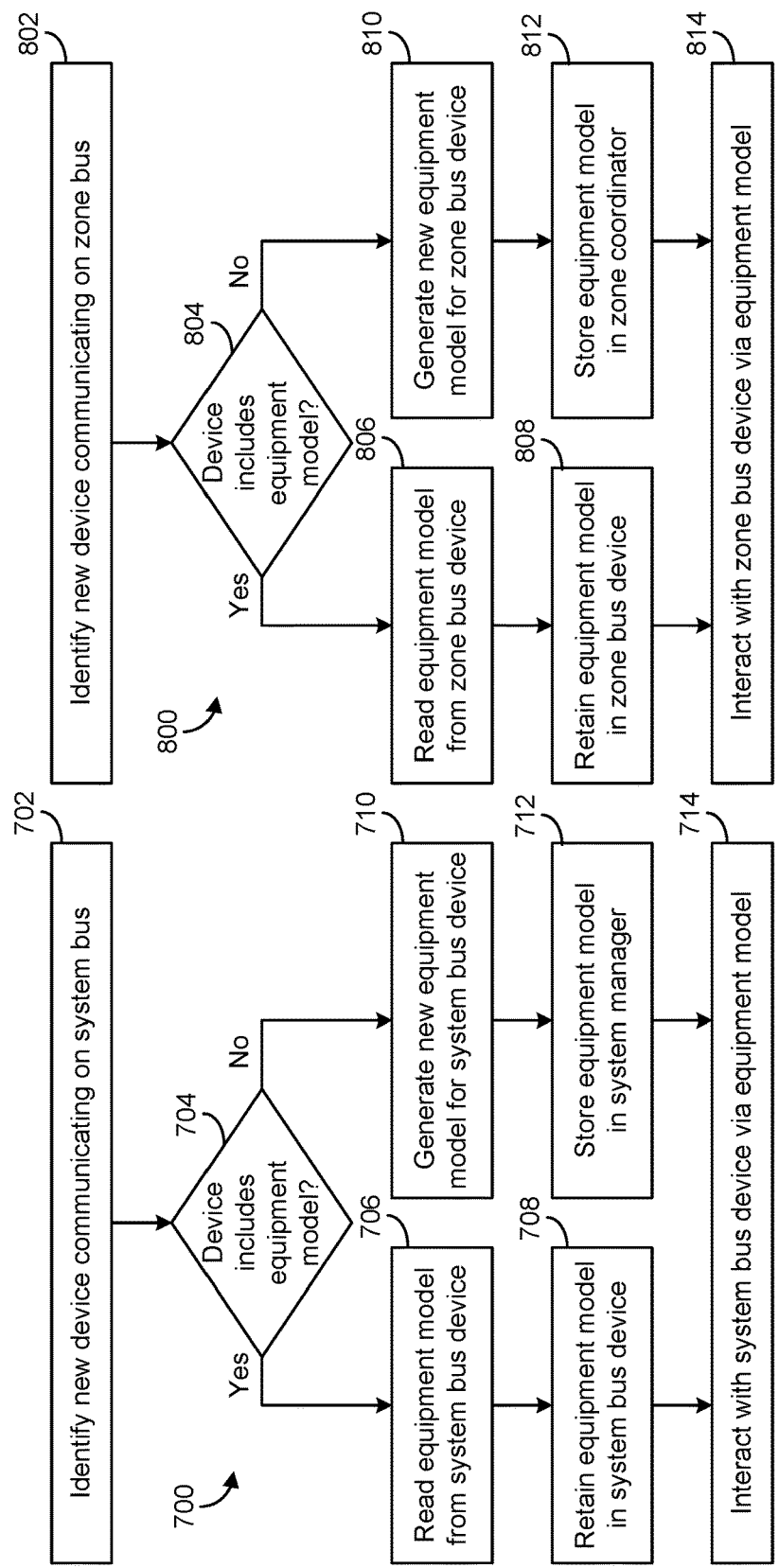

BUILDING MANAGEMENT SYSTEM WITH AUTOMATIC EQUIPMENT DISCOVERY AND EQUIPMENT MODEL DISTRIBUTION

BACKGROUND

The present disclosure relates generally to building management systems. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

One implementation of the present disclosure is a building management system including a system manager, a zone coordinator, and one or more zone controllers. The system manager includes a first system bus datalink having a first active node table stored therein. The zone coordinator includes a second system bus datalink and a zone bus datalink. A system bus connects the first system bus datalink to the second system bus datalink. Each zone controller is configured to monitor and control a building zone. A zone bus connects the zone bus datalink to the one or more zone controllers. The first active node table includes a plurality of nodes, each node representing a system bus device communicating on the system bus. The system manager is configured to monitor the first active node table for new nodes and to identify a new system bus device communicating on the system bus in response to a determination that the first active node table includes a new node.

In some embodiments, the first active node table includes a first table change counter, the first system bus datalink is configured to increment the first table change counter when a change to the first active node table occurs, and the system manager is configured to read the first active node table in response to a change of value (COV) of the first table change counter.

In some embodiments, the system manager includes a device list generator configured to use information from the first active node table to generate a device list identifying system bus devices communicating on the system bus. In some embodiments, the zone coordinator is configured to maintain a list of zone bus devices communicating on the zone bus and to provide the list of zone bus devices to the system manager. The system manager can be configured to generate a device tree including both the system bus devices communicating on the system bus and the zone bus devices communicating on the zone bus.

In some embodiments, each zone controller is connected to a sensor/actuator (SA) bus and configured to maintain a list of SA bus devices communicating on the SA bus. The zone coordinator can be configured to obtain the list of SA bus devices from each zone controller and provide the list of SA bus devices to the system manager. The system manager can be configured to update the device tree to include the system bus devices communicating on the system bus, the zone bus devices communicating on the zone bus, and the SA bus devices communicating on the SA bus. In some embodiments, the system manager is configured to generate an interactive user interface identifying the system bus devices, the zone bus devices, and the SA bus devices.

In some embodiments, the zone bus datalink has a second active node table stored therein. The second active node table can include a plurality of nodes, each node of the second active node table representing a zone bus device communicating on the zone bus. In some embodiments, the zone coordinator is configured to monitor the second active node table for new nodes and to identify a new zone bus device communicating on the zone bus in response to a determination that the second active node table includes a new node In some embodiments, the system manager is configured to retrieve an equipment model from the new system bus device and to generate a user interface including one or more point values identified by the equipment model.

In some embodiments, the system manager is configured to automatically identify the new system bus device without requiring the new system bus device to be placed in discovery mode and without sending a discovery command to the new system bus device.

In some embodiments, the system manager is configured to determine whether the new system bus device provides its own equipment model. The system manager can automatically generate a new equipment model for the new system bus device in response to a determination that the new system bus device does not provide its own equipment model. The system manager can store the new equipment model within the system manager.

In some embodiments, the zone coordinator is configured to identify one or more zone bus devices communicating on the zone bus, determine whether each of the identified zone bus devices provides its own equipment model, automatically generate a new equipment model for an identified zone bus device that does not provide its own equipment model, and store the new equipment model within the zone coordinator.

In some embodiments, the system manager is configured to identify one or more zone bus devices communicating on the zone bus and determine whether each of the identified zone bus devices provides its own equipment model. The system manager can communicate directly with each zone bus device that provides its own equipment model. The system manager can communicate with the zone coordinator to interact with each zone bus device that does not provide its own equipment model.

Another implementation of the present disclosure is a method for discovering equipment in a building management system. The method includes monitoring a first active node table for new nodes, each node representing a system bus device communicating on a system bus. The method includes identifying a new system bus device communicating on the system bus in response to a determination that the first active node table includes a new node and determining whether the new system bus device provides its own equipment model. The method includes retrieving the equipment model from the new system bus device in response to a determination that the new system bus device provides its own equipment model. The method includes automatically generating a new equipment model for the new system bus device in response to a determination that the new system bus device does not provide its own equipment model.

In some embodiments, the equipment model comprises a plurality of point objects that provide information about the new system bus device and store present values of variables or parameters used by the new system bus device.

In some embodiments, identifying the new system bus device includes incrementing a first table change counter when a change to the first active node table occurs and reading the first active node table in response to a change of value (COV) of the first table change counter.

In some embodiments, the method includes using information from the first active node table to generate a device list identifying system bus devices communicating on the system bus. In some embodiments, the method includes maintaining a list of zone bus devices communicating on a zone bus separate from the system bus and generating a device tree including both the system bus devices communicating on the system bus and the zone bus devices communicating on the zone bus.

In some embodiments, the method includes maintaining a list of sensor/actuator (SA) bus devices communicating on a SA bus separate from the system bus and the zone bus and updating the device tree to include the system bus devices communicating on the system bus, the zone bus devices communicating on the zone bus, and the SA bus devices communicating on the SA bus. In some embodiments, the method includes generating an interactive user interface identifying the system bus devices, the zone bus devices, and the SA bus devices.

In some embodiments, the method includes monitoring a second active node table for new nodes. Each node of the second active node table may represent a zone bus device communicating on a zone bus separate from the system bus. The method can further include identifying a new zone bus device communicating on the zone bus in response to a determination that the second active node table includes a new node.

In some embodiments, the first active node table is stored within a system bus datalink connected to the system bus and the second active node table is stored within a zone bus datalink connected to the zone bus.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 7 is a flow diagram illustrating a technique which can be used by the BMS of FIGS. 2A-2B to create and use equipment models for system bus devices, according to some embodiments.

FIG. 8 is a flow diagram illustrating a technique which can be used by the BMS of FIGS. 2A-2B to create and use equipment models for zone bus devices, according to some embodiments.

DETAILED DESCRIPTION

Referring generally to the FIGURES, a building management system (BMS) with automatic equipment discovery and equipment model distribution is shown, according to some embodiments. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

In brief overview, the BMS described herein provides a system architecture that facilitates automatic equipment discovery and equipment model distribution. Equipment discovery can occur on multiple levels of the BMS across multiple different communications busses (e.g., a system bus, zone buses, a sensor/actuator bus, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, the BMS can begin interacting with the new device (e.g., sending control signals, using data from the device) without user interaction.

Some devices in the BMS present themselves to the network using equipment models. An equipment model defines equipment object attributes, view definitions, schedules, trends, and the associated BACnet value objects (e.g., analog value, binary value, multistate value, etc.) that are used for integration with other systems. Some devices in the BMS store their own equipment models. Other devices in the BMS have equipment models stored externally (e.g., within other devices). For example, a zone coordinator can store the equipment model for a bypass damper. In some embodiments, the zone coordinator automatically creates the equipment model for the bypass damper and/or other devices on the zone bus. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Building and HVAC System

Figure 1:
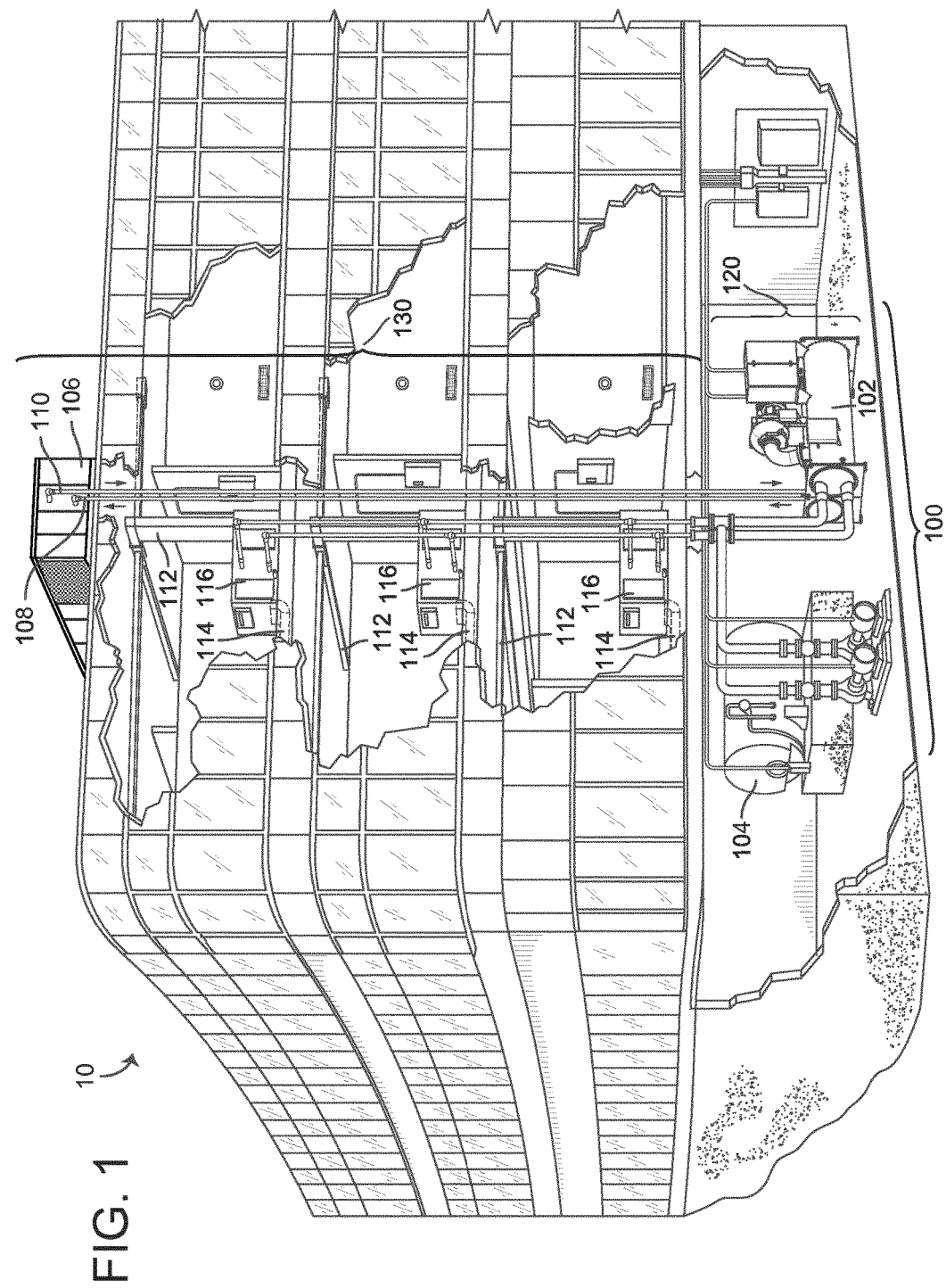
FIG. 1 is drawing of a building equipped with a heating, ventilating, and air conditioning (HVAC) system, according to some embodiments.

Referring now to FIG. 1, an exemplary building and HVAC system in which the systems and methods of the present invention can be implemented are shown, according to an exemplary embodiment. In FIG. 1, a perspective view of a building 10 is shown. Building 10 is served by a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary airside system which can be used in HVAC system 100 are described in greater detail with reference to FIG. 3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Building Management System

Figure 2A:
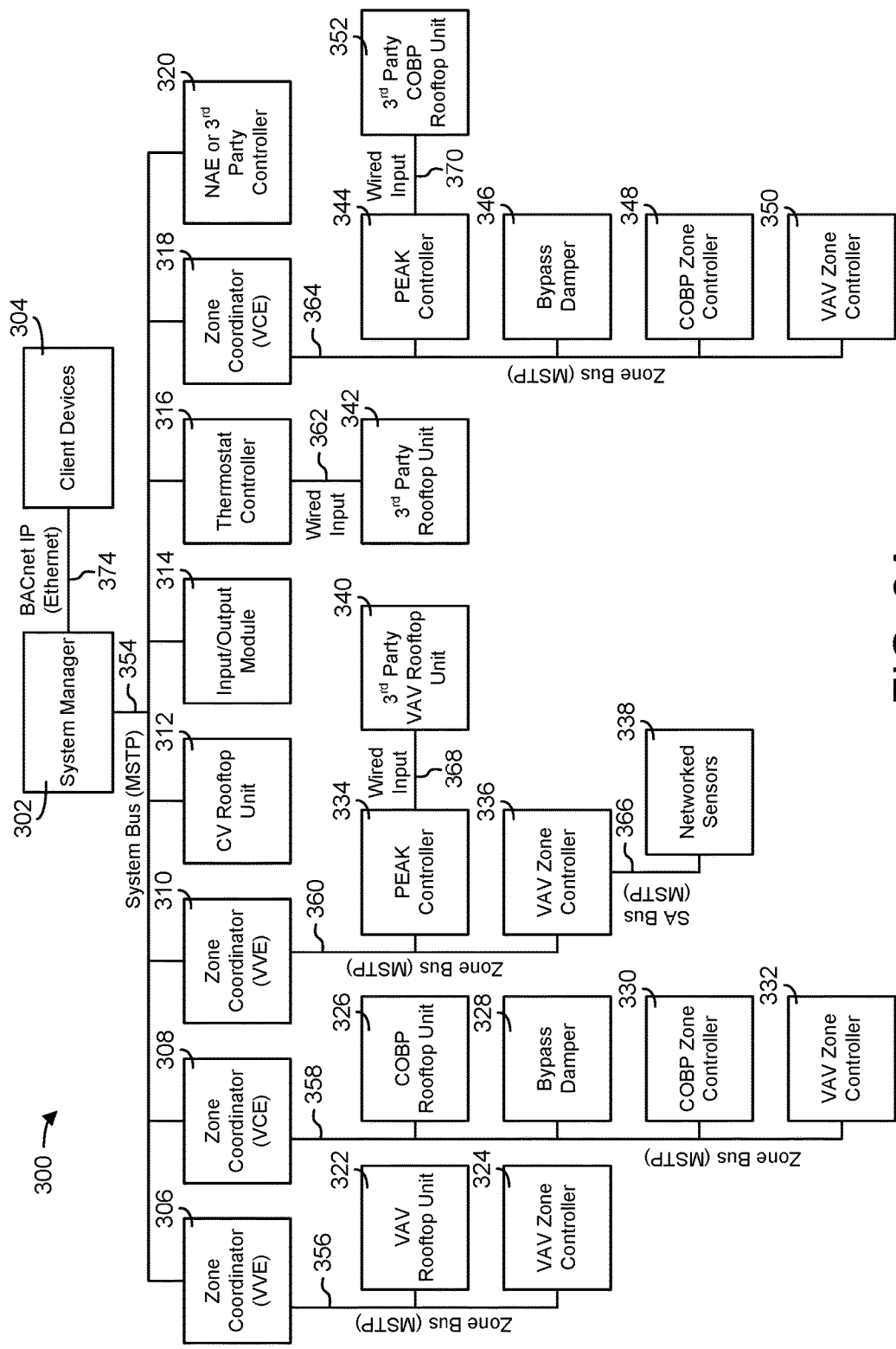
FIG. 2A is a block diagram of a building management system (BMS) which can be used to monitor and control the building and HVAC system of FIGS. 1-2, according to some embodiments.

Referring now to FIG. 2A, a block diagram of a building management system (BMS) 300 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 300 can be used to monitor and control the devices of HVAC system 100 and/or airside system 200 (e.g., HVAC equipment) as well as other types of BMS devices (e.g., lighting equipment, security equipment, etc.).

In brief overview, BMS 300 provides a system architecture that facilitates automatic equipment discovery and equipment model distribution. Equipment discovery can occur on multiple levels of BMS 300 across multiple different communications busses (e.g., a system bus 354, zone buses 356-360 and 364, sensor/actuator bus 366, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 300 can begin interacting with the new device (e.g., sending control signals, using data from the device) without user interaction.

Some devices in BMS 300 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of point objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices.

Some devices in BMS 300 store their own equipment models. Other devices in BMS 300 have equipment models stored externally (e.g., within other devices). For example, a zone coordinator 308 can store the equipment model for a bypass damper 328. In some embodiments, zone coordinator 308 automatically creates the equipment model for bypass damper 328 or other devices on zone bus 358. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2A, BMS 300 is shown to include a system manager 302; several zone coordinators 306, 308, 310 and 318; and several zone controllers 324, 330, 332, 336, 348, and 350. System manager 302 can communicate with client devices 304 (e.g., user devices, desktop computers, laptop computers, mobile devices, etc.) via a data communications link 374 (e.g., BACnet IP, Ethernet, wired or wireless communications, etc.). System manager 302 can provide a user interface to client devices 304 via data communications link 374. The user interface may allow users to monitor and/or control BMS 300 via client devices 304.

In some embodiments, system manager 302 is connected with zone coordinators 306-310 and 318 via a system bus 354. System bus 354 can include any of a variety of communications hardware (e.g., wire, optical fiber, terminals, etc.) configured to facilitate communications between system manager and other devices connected to system bus 354. Throughout this disclosure, the devices connected to system bus 354 are referred to as system bus devices. System manager 302 can be configured to communicate with zone coordinators 306-310 and 318 via system bus 354 using a master-slave token passing (MSTP) protocol or any other communications protocol. System bus 354 can also connect system manager 302 with other devices such as a constant volume (CV) rooftop unit (RTU) 312, an input/output module (IOM) 314, a thermostat controller 316 (e.g., a TEC3000 series thermostat controller), and a network automation engine (NAE) or third-party controller 320. RTU 312 can be configured to communicate directly with system manager 302 and can be connected directly to system bus 354. Other RTUs can communicate with system manager 302 via an intermediate device. For example, a wired input 362 can connect a third-party RTU 342 to thermostat controller 316, which connects to system bus 354.

System manager 302 can provide a user interface for any device containing an equipment model. Devices such as zone coordinators 306-310 and 318 and thermostat controller 316 can provide their equipment models to system manager 302 via system bus 354. In some embodiments, system manager 302 automatically creates equipment models for connected devices that do not contain an equipment model (e.g., IOM 314, third party controller 320, etc.). For example, system manager 302 can create an equipment model for any device that responds to a device tree request. The equipment models created by system manager 302 can be stored within system manager 302. System manager 302 can then provide a user interface for devices that do not contain their own equipment models using the equipment models created by system manager 302. In some embodiments, system manager 302 stores a view definition for each type of equipment connected via system bus 354 and uses the stored view definition to generate a user interface for the equipment.

Each zone coordinator 306-310 and 318 can be connected with one or more of zone controllers 324, 330-332, 336, and 348-350 via zone buses 356, 358, 360, and 364. Zone busses 356, 358, 360, and 364 can include any of a variety of communications hardware (e.g., wire, optical fiber, terminals, etc.) configured to facilitate communications between a zone coordinator and other devices connected to the corresponding zone bus. Throughout this disclosure, the devices connected to zone busses 356, 358, 360, and 364 are referred to as zone bus devices. Zone coordinators 306-310 and 318 can communicate with zone controllers 324, 330-332, 336, and 348-350 via zone busses 356-360 and 364 using a MSTP protocol or any other communications protocol. Zone busses 356-360 and 364 can also connect zone coordinators 306-310 and 318 with other types of devices such as variable air volume (VAV) RTUs 322 and 340, changeover bypass (COBP) RTUs 326 and 352, bypass dampers 328 and 346, and PEAK controllers 334 and 344.

Zone coordinators 306-310 and 318 can be configured to monitor and command various zoning systems. In some embodiments, each zone coordinator 306-310 and 318 monitors and commands a separate zoning system and is connected to the zoning system via a separate zone bus. For example, zone coordinator 306 can be connected to VAV RTU 322 and zone controller 324 via zone bus 356. Zone coordinator 308 can be connected to COBP RTU 326, bypass damper 328, COBP zone controller 330, and VAV zone controller 332 via zone bus 358. Zone coordinator 310 can be connected to PEAK controller 334 and VAV zone controller 336 via zone bus 360. Zone coordinator 318 can be connected to PEAK controller 344, bypass damper 346, COBP zone controller 348, and VAV zone controller 350 via zone bus 364.

A single model of zone coordinator 306-310 and 318 can be configured to handle multiple different types of zoning systems (e.g., a VAV zoning system, a COBP zoning system, etc.). Each zoning system can include a RTU, one or more zone controllers, and/or a bypass damper. For example, zone coordinators 306 and 310 are shown as Verasys VAV engines (VVEs) connected to VAV RTUs 322 and 340, respectively. Zone coordinator 306 is connected directly to VAV RTU 322 via zone bus 356, whereas zone coordinator 310 is connected to a third-party VAV RTU 340 via a wired input 368 provided to PEAK controller 334. Zone coordinators 308 and 318 are shown as Verasys COBP engines (VCEs) connected to COBP RTUs 326 and 352, respectively. Zone coordinator 308 is connected directly to COBP RTU 326 via zone bus 358, whereas zone coordinator 318 is connected to a third-party COBP RTU 352 via a wired input 370 provided to PEAK controller 344.

Zone controllers 324, 330-332, 336, and 348-350 can communicate with individual BMS devices (e.g., sensors, actuators, etc.) via sensor/actuator (SA) busses. For example, VAV zone controller 336 is shown connected to networked sensors 338 via SA bus 366. Networked sensors 338 can include, for example, temperature sensors, humidity sensors, pressure sensors, lighting sensors, security sensors, or any other type of device configured to measure and/or provide an input to zone controller 336. Zone controller 336 can communicate with networked sensors 338 using a MSTP protocol or any other communications protocol. Although only one SA bus 366 is shown in FIG. 2A, it should be understood that each zone controller 324, 330-332, 336, and 348-350 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 324, 330-332, 336, and 348-350 can be configured to monitor and control a different building zone. Zone controllers 324, 330-332, 336, and 348-350 can use the inputs and outputs provided via their SA busses to monitor and control various building zones. For example, a zone controller 336 can use a temperature input received from networked sensors 338 via SA bus 366 (e.g., a measured temperature of a building zone) as feedback in a temperature control algorithm. Zone controllers 324, 330-332, 336, and 348-350 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 2B:
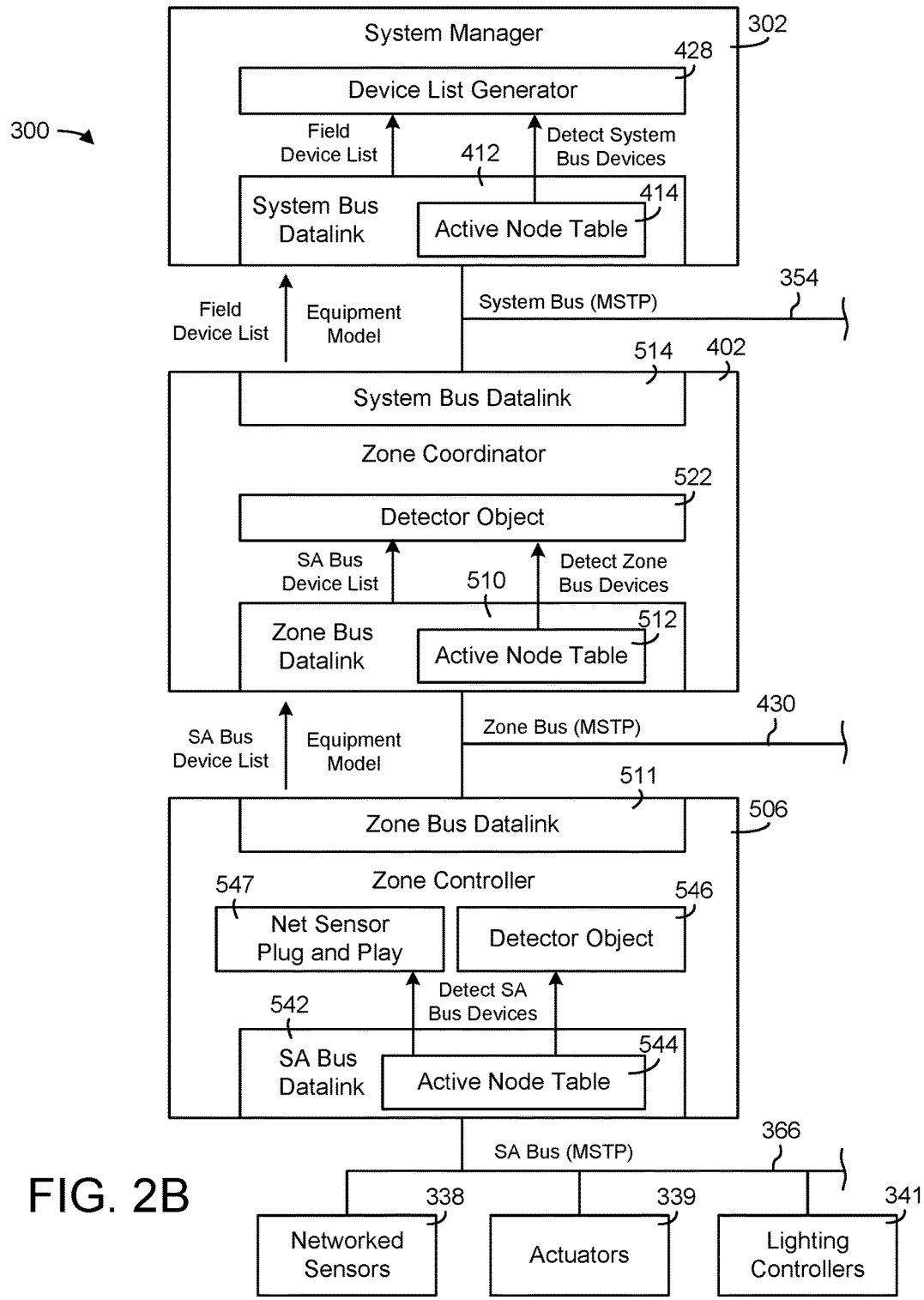
FIG. 2B is a block diagram illustrating a system manager, zone coordinator, and zone controller of the BMS of FIG. 2A in greater detail, according to some embodiments.

Referring now to FIG. 2B, a block diagram illustrating a portion of BMS 300 in greater detail is shown, according to an exemplary embodiment. BMS 300 is shown to include system manager 302, a zone coordinator 402, and a zone controller 506. Zone coordinator 402 can be any of zone coordinators 306-310 or 318. Zone controller 506 can be any of zone controllers 324, 330, 332, 336, 348, or 350. Zone coordinator 402 can be connected with system manager via system bus 354. For example, system bus 354 is shown connecting a first system bus datalink 412 within system manager 302 with a second system bus datalink 514 within zone coordinator 402. Zone coordinator 402 can connected with zone controller 506 via a zone bus 430. For example, zone bus 430 is shown connecting a first zone bus datalink 510 within zone coordinator 402 with a second zone bus datalink 511 within zone controller 506. Zone bus 430 can be any of zone busses 356-360 or 364. Zone controller 506 is connected with networked sensors 338 and actuators 339 via a SA bus 366.

BMS 300 can automatically discover new equipment connected to any of system bus 354, zone bus 430, and SA bus 366. Advantageously, the equipment discovery can occur automatically (e.g., without user action) without requiring the equipment to be placed in discovery mode and without sending a discovery command to the equipment. In some embodiments, the automatic equipment discovery is based on active node tables for system bus 354, zone bus 430, and SA bus 366. Each active node table can provide status information for the devices communicating on a particular bus. For example, the active node table 414 for system bus 354 can indicate which MSTP devices are participating in the token ring used to exchange information via system bus 354. Active node table 414 can identify the devices communicating on system bus 354 by MAC address or other device identifier. Devices that do not participate in the token ring (e.g., MSTP slave devices) can be automatically discovered using a net sensor plug and play (described in greater detail below).

The active node table for each communications bus can be stored within one or more devices connected to the bus. For example, active node table 414 can be stored within system manager 302. In some embodiments, active node table 414 is part of a system bus datalink 412 (e.g., a MSTP datalink) used by system manager 302 to communicate via system bus 354. System manager 302 can subscribe to changes in value of active node table 414 and can receive a notification (e.g., from system bus datalink 412) when a change in active node table 414. In response to a notification that a change in active node table 414 has occurred, system manager 302 can read active node table 414 to detect and identify the devices connected to system bus 354.

In some embodiments, a device list generator 428 within system manager 302 generates a list of the devices connected to system bus 354 (i.e., a device list) based on active node table 414 and stores the device list within system manager 302. The device list generated by system manager 302 can include information about each device connected to system bus 354 (e.g., device type, device model, device ID, MAC address, device attributes, etc.). When a new device is detected on system bus 354, system manager 302 can automatically retrieve the equipment model from the device if the device stores its own equipment model. If the device does not store its own equipment model, system manager 302 can retrieve a list of point values provided by the device. System manager 302 can then use the equipment model and/or list of point values to present information about the connected system bus devices to a user.

The active node tables for each zone bus can be stored within the zone coordinator connected to the zone bus. For example, the active node table 512 for zone bus 430 can be stored within zone coordinator 402. In some embodiments, active node table 512 is part of a zone bus datalink 510 (e.g., a MSTP datalink) used by the zone coordinator 402 to communicate via zone bus 430. Zone coordinator 402 can subscribe to changes in value of active node table 512 and can receive a notification (e.g., from zone bus datalink 510) when a change in active node table 512 occurs. In response to a notification that a change to active node table 512 has occurred, zone coordinator 402 can read active node table 512 to identify the devices connected to zone bus 430.

In some embodiments, a detector object 522 of zone coordinator 402 generates a list of the devices communicating on zone bus 430 (i.e., a device list) based on active node table 512 and stores the device list within zone coordinator 402. Each zone coordinator in BMS 300 can generate a list of devices on the connected zone bus. The device list generated by each zone coordinator 402 can include information about each device connected to zone bus 430 (e.g., device type, device model, device ID, MAC address, device attributes, etc.). When a new device is detected on zone bus 430, the connected zone coordinator 402 can automatically retrieve the equipment model from the device if the device stores its own equipment model. If the device does not store its own equipment model, the connected zone coordinator 402 can retrieve a list of point values provided by the device.

Zone coordinator 402 can incorporate the new zone bus device into the zoning logic and can inform system manager 302 that a new zone bus device has been added. For example, zone coordinator 402 is shown providing a field device list to system manager 302. The field device list can include a list of devices connected to zone bus 430 and/or SA bus 366. System manager 302 can use the field device list and the list of system bus devices to generate a device tree including all of the devices in BMS 300. In some embodiments, zone coordinator 402 provides an equipment model for a connected zone bus device to system manager 302. System manager 302 can then use the equipment model and/or list of point values for the new zone bus device to present information about the new zone bus device to a user.

In some embodiments, the device list generated by each zone coordinator 402 indicates whether system manager 302 should communicate directly with the listed zone bus device (e.g., VAV RTU 322, VAV zone controller 324, etc.) or whether system manager 302 should communicate with the intermediate zone coordinator 402 on behalf of the zone bus device. In some embodiments, system manager 302 communicates directly with zone bus devices that provide their own equipment models, but communicates with the intermediate zone coordinator 402 for zone bus devices that do not provide their own equipment model. As discussed above, the equipment models for zone bus devices that do not provide their own equipment model can be generated by the connected zone coordinator 402 and stored within the zone coordinator 402. Accordingly, system manager 302 may communicate directly with the device that stores the equipment model for a connected zone bus device (i.e., the zone bus device itself or the connected zone coordinator 402).

The active node table 544 for SA bus 366 can be stored within zone controller 506. In some embodiments, active node table 544 is part of the SA bus datalink 542 (e.g., a MSTP datalink) used by zone controller 506 to communicate via SA bus 366. Zone controller 506 can subscribe to changes in value of the active node table 544 and can receive a notification (e.g., from SA bus datalink 542) when a change in active node table 544 occurs. In response to a notification that a change to active node table 544 has occurred, zone controller 506 can read active node table 544 to identify some or all of the devices connected to SA bus 366. In some embodiments, active node table 544 identifies only the SA bus devices participating in the token passing ring via SA bus 366 (e.g., MSTP master devices). Zone controller 506 can include an additional net sensor plug and play (NsPnP) 547 configured to detect SA bus devices that do not participate in the token passing ring (e.g., MSTP slave devices).

In some embodiments, NsPnP 547 is configured to actively search for devices connected to SA bus 366 (e.g., networked sensors 338, actuators 339, lighting controllers 341, etc.). For example, NsPnP 547 can send a "ping" to a preconfigured list of MSTP slave MAC addresses. For each SA bus device that is discovered (i.e. responds to the ping), NsPnP 547 can dynamically bring it online. NsPnP 547 can bring a device online by creating and storing an instance of a SA bus device object representing the discovered SA bus device. NsPnP 547 can automatically populate the SA bus device object with all child point objects needed to collect and store point data (e.g., sensor data) from the newly-discovered SA bus device. In some embodiments, NsPnP 547 automatically maps the child point objects of the SA bus device object to attributes of the equipment model for zone controller 506. Accordingly, the data points provided by the SA bus devices can be exposed to zone coordinator 402 and other devices in BMS 300 as attributes of the equipment model for zone controller 506.

In some embodiments, a detector object 546 of zone controller 506 generates a list of the devices connected to SA bus 366 (i.e., a device list) based on active node table 544 and stores the device list within zone controller 506. NsPnP 547 can update the device list to include any SA bus devices discovered by NsPnP 547. The device list generated by zone controller 506 can include information about each device connected to SA bus 366 (e.g., device type, device model, device ID, MAC address, device attributes, etc.). When a new device is detected on SA bus 366, zone controller 506 can automatically retrieve the equipment model from the device if the device stores its own equipment model. If the device does not store its own equipment model, zone controller 506 can retrieve a list of point values provided by the device.

Zone controller 506 can incorporate the new SA bus device into the zone control logic and can inform zone coordinator 402 that a new SA bus device has been added. Zone coordinator 402 can then inform system manager 302 that a new SA bus device has been added. For example, zone controller 506 is shown providing a SA device list to zone coordinator 402. The SA device list can include a list of devices connected to SA bus 366. Zone coordinator 402 can use the SA device list and the detected zone bus devices to generate the field device list provided to system manager 302. In some embodiments, zone controller 506 provides an equipment model for a connected SA bus device to zone coordinator 402, which can be forwarded to system manager 302. System manager 302 can then use the equipment model and/or list of point values for the new SA bus device to present information about the new SA bus device to a user. In some embodiments, data points provided by the SA bus device are shown as attributes of the zone controller 506 to which the SA bus device is connected.

Airside System

Figure 3:
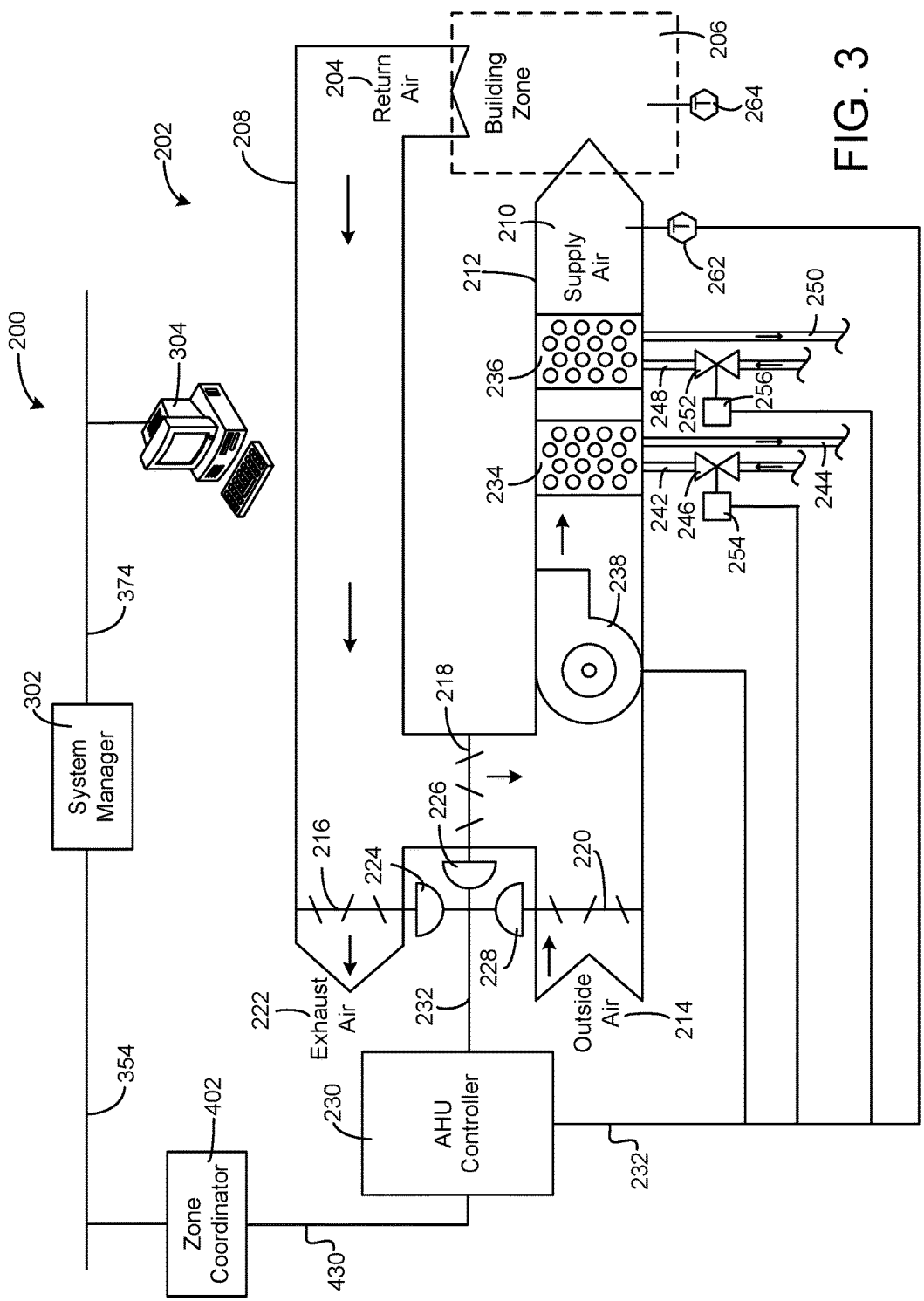
FIG. 3 is a block diagram of an airside system which can be used in the HVAC system of FIG. 1, according to some embodiments.

Referring now to FIG. 3, a block diagram of an airside system 200 is shown, according to an exemplary embodiment. In various embodiments, airside system 200 can supplement or replace airside system 130 in HVAC system 100 or can be implemented separate from HVAC system 100. When implemented in HVAC system 100, airside system 200 can include a subset of the HVAC devices in HVAC system 100 (e.g., AHU 106, VAV units 116, ducts 112-114, fans, dampers, etc.) and can be located in or around building 10. In some embodiments, airside system 200 can be used in BMS 300 as a VAV rooftop unit 322 or 340 and/or as a COBP rooftop unit 326 or 352. Airside system 200 can operate to heat or cool an airflow provided to building 10.

Airside system 200 is shown to include an economizer-type air handling unit (AHU) 202. Economizer-type AHUs vary the amount of outside air and return air used by the air handling unit for heating or cooling. For example, AHU 202 can receive return air 204 from building zone 206 via return air duct 208 and can deliver supply air 210 to building zone 206 via supply air duct 212. In some embodiments, AHU 202 is a rooftop unit located on the roof of building 10 (e.g., AHU 106 as shown in FIG. 1) or otherwise positioned to receive both return air 204 and outside air 214. AHU 202 can be configured to operate exhaust air damper 216, mixing damper 218, and outside air damper 220 to control an amount of outside air 214 and return air 204 that combine to form supply air 210. Any return air 204 that does not pass through mixing damper 218 can be exhausted from AHU 202 through exhaust damper 216 as exhaust air 222.

Each of dampers 216-220 can be operated by an actuator. For example, exhaust air damper 216 can be operated by actuator 224, mixing damper 218 can be operated by actuator 226, and outside air damper 220 can be operated by actuator 228. Actuators 224-228 can communicate with an AHU controller 230 via a sensor/actuator (SA) bus 232. Actuators 224-228 can receive control signals from AHU controller 230 and can provide feedback signals to AHU controller 230. Feedback signals can include, for example, an indication of a current actuator or damper position, an amount of torque or force exerted by the actuator, diagnostic information (e.g., results of diagnostic tests performed by actuators 224-228), status information, commissioning information, configuration settings, calibration data, and/or other types of information or data that can be collected, stored, or used by actuators 224-228. AHU controller 230 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 224-228.

Still referring to FIG. 3, AHU 202 is shown to include a cooling coil 234, a heating coil 236, and a fan 238 positioned within supply air duct 212. Fan 238 can be configured to force supply air 210 through cooling coil 234 and/or heating coil 236 and provide supply air 210 to building zone 206. AHU controller 230 can communicate with fan 238 via SA bus 232 to control a flow rate of supply air 210. In some embodiments, AHU controller 230 controls an amount of heating or cooling applied to supply air 210 by modulating a speed of fan 238.

Cooling coil 234 can receive a chilled fluid from waterside system 120 via piping 242 and can return the chilled fluid to waterside system 120 via piping 244. Valve 246 can be positioned along piping 242 or piping 244 to control a flow rate of the chilled fluid through cooling coil 234. In some embodiments, cooling coil 234 includes multiple stages of cooling coils that can be independently activated and deactivated (e.g., by AHU controller 230) to modulate an amount of cooling applied to supply air 210.

Heating coil 236 may receive a heated fluid from waterside system 120 via piping 248 and can return the heated fluid to waterside system 120 via piping 250. Valve 252 can be positioned along piping 248 or piping 250 to control a flow rate of the heated fluid through heating coil 236. In some embodiments, heating coil 236 includes multiple stages of heating coils that can be independently activated and deactivated (e.g., by AHU controller 230) to modulate an amount of heating applied to supply air 210.

Each of valves 246 and 252 can be controlled by an actuator. For example, valve 246 can be controlled by actuator 254 and valve 252 can be controlled by actuator 256. Actuators 254-256 can communicate with AHU controller 230 via SA bus 232. Actuators 254-256 can receive control signals from AHU controller 230 and can provide feedback signals to AHU controller 230. In some embodiments, AHU controller 230 receives a measurement of the supply air temperature from a temperature sensor 262 positioned in supply air duct 212 (e.g., downstream of cooling coil 234 and/or heating coil 236).

In some embodiments, AHU controller 230 operates valves 246 and 252 via actuators 254-256 to modulate an amount of heating or cooling provided to supply air 210 (e.g., to achieve a setpoint temperature for supply air 210 or to maintain the temperature of supply air 210 within a setpoint temperature range). The positions of valves 246 and 252 affect the amount of heating or cooling provided to supply air 210 by cooling coil 234 or heating coil 236 and may correlate with the amount of energy consumed to achieve a desired supply air temperature. In some embodiments, AHU controller 230 receives a measurement of the zone temperature from a temperature sensor 264 positioned within building zone 206. AHU controller 230 can control the temperature of supply air 210 and/or building zone 206 by activating or deactivating coils 234-236, adjusting a speed of fan 238, or a combination of both.

Still referring to FIG. 3, AHU controller 230 can be connected to zone coordinator 402 via zone bus 430 (e.g., a MSTP communications bus). Similarly, zone coordinator 402 can be connected to system manager 302 via system bus 354 (e.g., another MSTP communications bus). Zone bus 430 and system bus 354 can include any of a variety of communications hardware (e.g., wires, optical fiber, terminals, etc.) and/or communications software configured to facilitate communications between AHU controller 230, zone coordinator 402, and system manager 302. System manager 302 can communicate with client device 304 via data communications link 374 (e.g., BACnet IP, Ethernet, wired or wireless communications, etc.).

Client device 304 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, airside system 200, BMS 300, and/or the various subsystems, and devices thereof. Client device 304 can be a computer workstation, a client terminal, a remote or local interface, or any other type of user interface device. Client device 304 can be a stationary terminal or a mobile device. For example, client device 304 can be a desktop computer, a computer server with a user interface, a laptop computer, a tablet, a smartphone, a PDA, or any other type of mobile or non-mobile device.

System Manager

Figure 4:
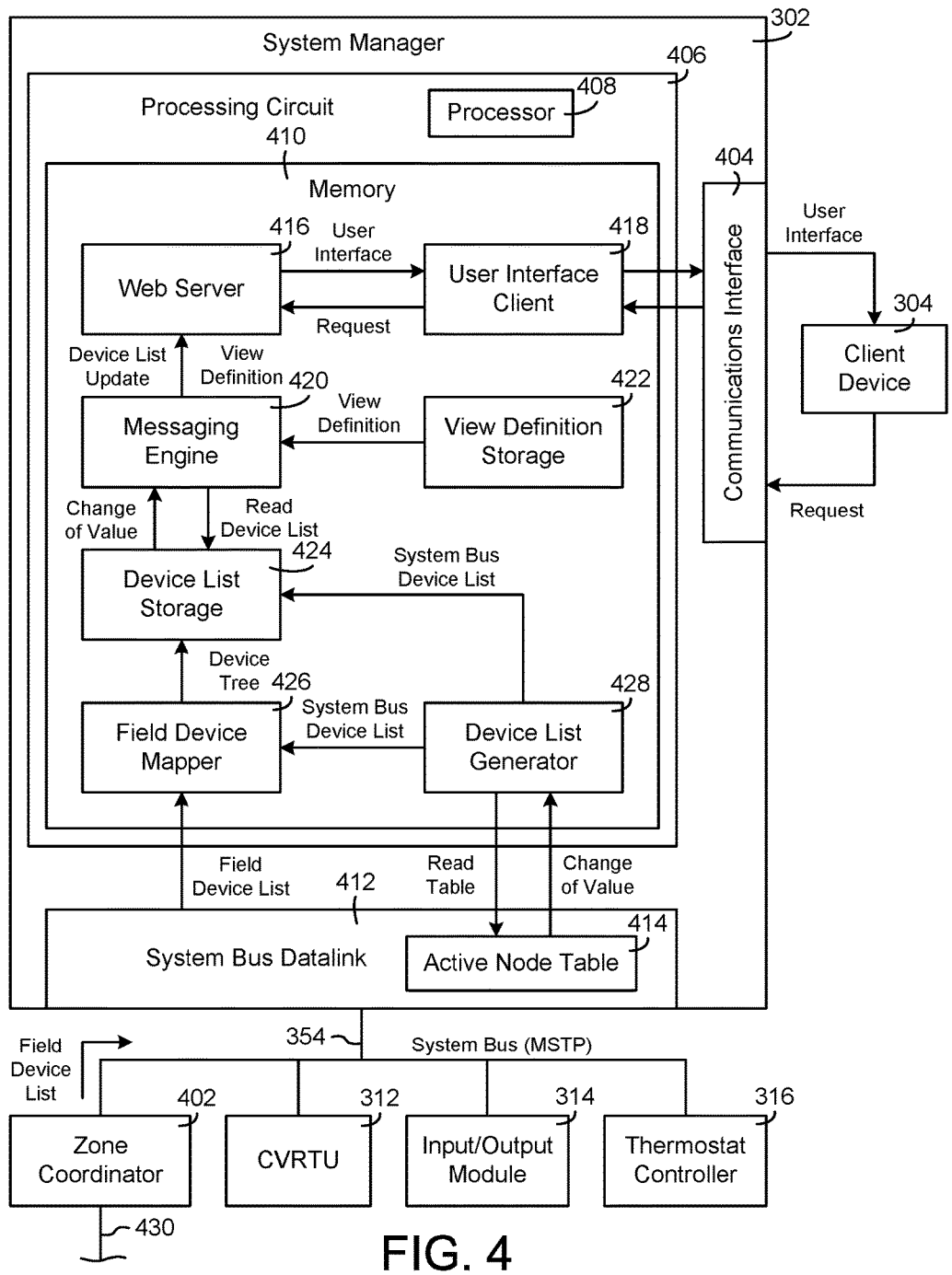
FIG. 4 is a block diagram illustrating the system manager of FIG. 2B in greater detail, according to some embodiments.

Referring now to FIG. 4, a block diagram illustrating system manager 302 in greater detail is shown, according to an exemplary embodiment. System manager 302 is shown to include a system bus datalink 412, a communications interface 404, and a processing circuit 406. System bus datalink 412 connects to system bus 354 and can be used by system manager 302 to communicate with various other devices connected to system bus 354. For example, system bus datalink 412 can be used to communicate with zone coordinator 402 (i.e., any of zone coordinators 306-310 and 318), CVRTU 312, IOM 314, and/or thermostat controller 316.

System bus datalink 412 is shown to include an active node table 414. Active node table 414 provides status information for the devices connected to system bus 354. For example, active node table 414 can indicate which MSTP devices are participating in the token ring used to exchange information via system bus 354. In some embodiments, active node table 414 is a table in the form of an array of bytes. The location of each byte in active node table 414 may represent the token ring participation status of a particular node or device connected to system bus 354. Devices connected to system bus 354 can be identified by MAC address (or any other device identifier) in active node table 414. Advantageously, active node table 414 can list the MAC addresses of the devices connected to system bus 354 without requiring the devices to be placed in discovery mode.

In some embodiments, active node table 414 includes a change counter attribute. Each time a change to active node table 414 occurs (e.g., a new device begins communicating on system bus 354), the change counter attribute can be incremented by system bus datalink 412. Other objects or devices interested in the status of active node table 414 can subscribe to a change of value (COV) of the change counter attribute. When the change counter attribute is incremented, system bus datalink 412 can report the COV to any object or device that has subscribed to the COV. For example, device list generator 428 can subscribe to the COV of the change counter attribute and can be automatically notified of the COV when a change to active node table 414 occurs. In response to receiving the COV notification, device list generator 428 can read active node table 414. Device list generator 428 can use the information from active node table 414 to generate a list of devices connected to system bus 354. Device list generator 428 is described in greater detail below.

Communications interface 404 can facilitate communications between system manager 302 and external systems, devices, or applications. For example, communications interface 404 can be used by system manager 302 to communicate with client device 304 (e.g., a tablet, a laptop computer, a smartphone, a desktop computer, a computer workstation, etc.), monitoring and reporting applications, enterprise control applications, remote systems and applications, and/or other external systems or devices for allowing user control, monitoring, and adjustment to BMS 300 and/or system manager 302.

Communications interface 404 can include wired or wireless communications interfaces (e.g., jacks, antennas, transmitters, receivers, transceivers, wire terminals, etc.) for conducting data communications with client device 304 or other external systems or devices. In various embodiments, communications conducted via interface 404 can be direct (e.g., local wired or wireless communications) or via a communications network (e.g., a WAN, the Internet, a cellular network, etc.). For example, communications interface 404 can include an Ethernet card and port for sending and receiving data via an Ethernet-based communications link or network. In another example, communications interface 404 can include a WiFi transceiver for communicating via a wireless communications network. In another example, communications interface 404 can include cellular or mobile phone communications transceivers. In one embodiment, communications interface 404 is a power line communications interface and/or an Ethernet interface.

Processing circuit 406 is shown to include a processor 408 and memory 410. Processor 408 can be a general purpose or specific purpose processor, an application specific integrated circuit (ASIC), one or more field programmable gate arrays (FPGAs), a group of processing components, or other suitable processing components. Processor 408 is configured to execute computer code or instructions stored in memory 410 or received from other computer readable media (e.g., CDROM, network storage, a remote server, etc.).

Memory 410 can include one or more devices (e.g., memory units, memory devices, storage devices, etc.) for storing data and/or computer code for completing and/or facilitating the various processes described in the present disclosure. Memory 410 can include random access memory (RAM), read-only memory (ROM), hard drive storage, temporary storage, non-volatile memory, flash memory, optical memory, or any other suitable memory for storing software objects and/or computer instructions. Memory 410 can include database components, object code components, script components, or any other type of information structure for supporting the various activities and information structures described in the present disclosure. Memory 410 can be communicably connected to processor 408 via processing circuit 406 and can include computer code for executing (e.g., by processor 408) one or more processes described herein. When processor 408 executes instructions stored in memory 410, processor 408 generally configures system manager 302 (and more particularly processing circuit 406) to complete such activities.

Still referring to FIG. 4, system manager 302 is shown to include a device list generator 428 and a field device mapper 426. Device list generator 428 can sign up or subscribe to a change in value (COV) of the change counter attribute of active node table 414. When a change to active node table 414 occurs, system bus datalink 412 can provide a COV notification to device list generator 428. In response to receiving the COV notification, device list generator 428 can read active node table 414. Device list generator 428 can use the information from active node table 414 to generate a list of devices connected to system bus 354. The system bus device list can be stored in device list storage 424 and/or provided to filed device mapper 426.

Field device mapper 426 can sign up or subscribe to a COV of a field device list maintained by zone coordinator 402. Field devices can include any device connected to zone bus 430 (i.e., one of zone busses 356-360 or 364) either directly or via an intermediate device such as a PEAK controller or zone controller. Zone coordinator 402 can maintain a list of the field devices connected to zone bus 430 in the same way that system manager 302 maintains the list of system bus devices connected to system bus 354. In some embodiments, the list of field devices maintained by zone coordinator 402 includes a change counter attribute. When a change to the list of field bus devices occurs, zone coordinator 402 can provide a COV notification to field device mapper 426. In response to receiving the COV notification, field device mapper 426 can read the list of field devices maintained by zone coordinator 402 to identify the field devices connected to zone bus 430.

Field device mapper 426 can use the list of devices from zone coordinator 402 to generate a device tree including both the devices connected to system bus 354 and the field devices connected to zone bus 430. The device tree can be a hierarchy of devices in BMS 300. For example, the list of system bus devices can be updated to include the list of field devices associated with each zone coordinator hierarchically below the associated zone coordinator in the system bus device list. In this way, the list of devices can be updated to include hierarchical information with system bus devices at a first level of the hierarchy and zone bus devices at a lower level of the hierarchy (e.g., hierarchically below each zone coordinator in the list of system bus devices). In some embodiments, device list storage 424 includes a device list change counter attribute. The change counter attribute can be incremented each time an update to the stored device lists occurs.

Still referring to FIG. 4, system manager 302 is shown to include a messaging engine 420. Messaging engine 420 can sign up or subscribe to a COV in the device list stored in device list storage 424. When a change to the stored device list occurs, device list storage 424 can provide a COV notification to messaging engine 420. In response to receiving the COV notification, messaging engine 420 can read the device list stored in device list storage 424 to identify all of the devices connected to system bus 354, any of zone busses 356-360 or 364, and/or SA bus 366. In some embodiments, messaging engine 420 translates the list of devices into format which can be presented to a user. For example, messaging engine 420 can translate the list of devices into a JavaScript object notation, HTML format, or any other format that facilitates presentation to a user. Messaging engine 420 can provide the updated and translated device list to web server 416.

In some embodiments, messaging engine 420 receives a request for a view definition from web server 416. The view definition may identify a set of attributes for a particular device that are core to the functionality of the device. Each device or type of device in BMS 300 may have a different view definition. For example, the view definition for a chiller controller may identify the chiller outlet temperature as an important data point; however, the view definition for a valve controller may not identify such a data point as important to the operation of the valve. In some embodiments, the view definition for a device identifies a subset of the data objects defined by the equipment model for the device. Web server 416 may use the view definition to dynamically select a subset of the stored data objects for inclusion in a web interface (e.g., a webpage) generated by web server 416.

In some embodiments, view definitions for all the devices in BMS 300 are stored in view definition storage 422 within system manager 302. In other embodiments, view definitions can be stored in the devices themselves (e.g., within zone coordinators, VAV zone controllers, RTUs, etc.). In some embodiments, the view definition for a device is a component of the device's equipment model and is provided to system manager 302 by connected devices along with the equipment models. For example, the devices connected to system bus 354 and/or zone busses 356-360 and 364 can provide their own view definitions to system manager 302.

If a device does not provide its own view definition, system manager 302 can create or store view definitions for the device. If the view definition provided by a particular device is different from an existing view definition for the device stored in system manager 302, the system manager's view definition may override or supersede the view definition provided by the device. In some embodiments, the view definition for a device includes the device's user name and description. Accordingly, the web interface generated by web server 416 can include the device's user name and description when the web interface is generated according to the view definition.

Still referring to FIG. 4, system manager 302 is shown to include a web server 416 and a user interface (UI) client 418. Web server 416 can receive a request for a device list from UI client 418 and can generate a web interface that includes the requested device list. In some embodiments, web server 416 uses the updated device list from messaging engine 420 (i.e., the device tree) to generate the web interface. Web server 416 can use the view definition for each device in the device list to determine which attributes of the devices to include in the web interface. In some embodiments, web server 416 generates a home page for each type of equipment based on a home page view definition for the equipment type. The home page view definition can be stored in system manager 302 (e.g., in view definition storage). Other view definitions can be stored in system manager 302 or received from the equipment at runtime.

The view definition file may identify a subset of the data objects listed in the equipment model (e.g., equipment attributes, data points, etc.). The data objects listed in the view definition may be included in the web interface generated by web server 416 and provided to client device 304. The view definition may group the data objects differently than the equipment model. For example, the view definition may group the data objects in a manner that is intuitive for a user attempting to commission, monitor, or control the device via the web interface. Web server 416 may use the view definition to dynamically select a subset of the stored data objects for inclusion in the web interface generated by web server 416.

In some embodiments, web server 416 is a modified Unison HTTP server. Web server 416 may include SSL support for secure connections and the ability for CGI scripts to define their own HTTP status codes. Web server 416 may include support for HTTP authentication (e.g., using a Unison security/login module) as well as support for HTTP 0.9, 1.0, and 1.1. Web server 416 may support dynamic content via CGI scripts (e.g., written in C or any other scripting language) and may support multiple and simultaneous connections by clients.

Web server 416 may be configured to interface with the other components of system manager 302 (e.g., natively or via CGI scripts). For example, web server 416 may be configured to read data objects from messaging engine 420, device list storage 424, and/or view definition storage 422 and use the data to generate the web interface provided to client device 304. Web server 416 may be configured to receive data from client device 304 and write data to the data objects based on the input received from client device 304. Web server 416 may be configured to access the equipment model and/or the view definition to determine which of the data objects to include in the generated web interface. Web server 416 may dynamically generate the web interface based on the information provided in the equipment model and/or the view definition.

In some embodiments, web server 416 uses Common Gateway Interface (CGI) scripts to perform some or all of the functions described herein. The CGI scripts may be stored within the memory of system manager 302 and provided to client device 304 in conjunction with the web interface generated by the web server 416. In some embodiments, web server 416 integrates the CGI scripts with the web interface and provides the integrated web interface (e.g., with embedded CGI scripts) to client device 304. A web browser running on client device 304 may run the CGI scripts to request various types of data from system manager 302 via web server 416.

UI client 418 receives the web interface from web server 416 and provides the web interface as a user interface to client device 304. In some embodiments, the web interface includes the updated list of devices received from messaging engine 420. The web interface can include attributes or data points associated with each listed device. For example, the web interface can include analog inputs or outputs, binary inputs or outputs, enumerated value inputs or outputs, multistate inputs or outputs, string inputs or outputs, or any other type of or value associated with a particular device (e.g., device name, measured values, operating mode, etc.).

In some embodiments, the web interface is interactive and allows a user to modify or write various object attributes. The modified object attributes can be provided to system manager 302 via user interface client 418 and used by system manager 302 to update attributes in the equipment models for the listed devices. If the equipment models are stored within zone coordinator 402 or other devices in BMS 300, the updated attribute values can be distributed to such devices via system bus 354 and used to update the equipment models stored in such devices. An example of an interactive web interface that can be generated by web server 416 based on a stored view definition and/or device list is described in detail in U.S. patent application Ser. No. 15/146,660 titled "HVAC Equipment Providing a Dynamic Web Interface Systems and Methods" and filed May 4, 2016, the entire disclosure of which is incorporated by reference herein.

Zone Coordinator

Figure 5:
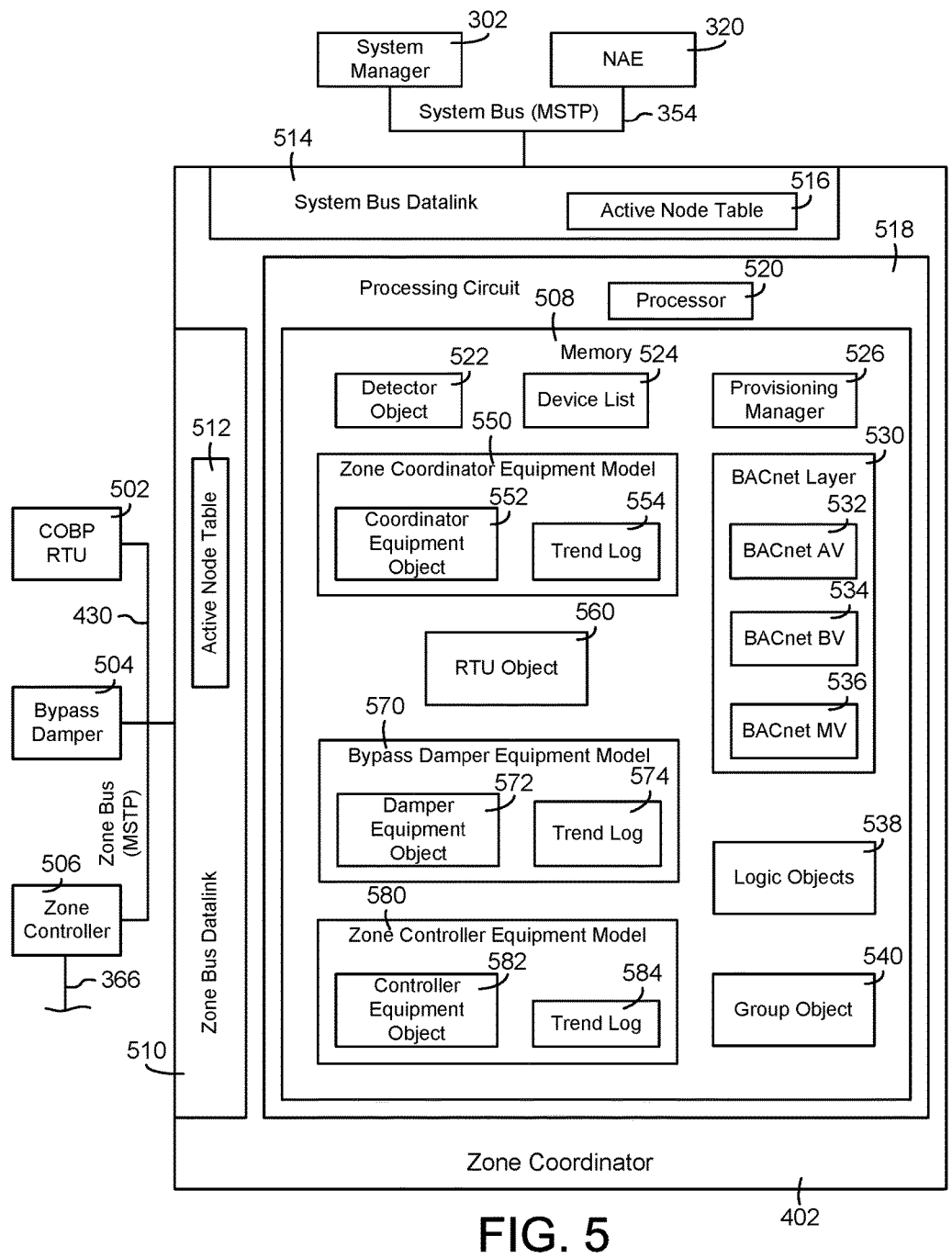
FIG. 5 is a block diagram illustrating the zone coordinator of FIG. 2B in greater detail, according to some embodiments.

Referring now to FIG. 5, a block diagram illustrating zone coordinator 402 in greater detail is shown, according to an exemplary embodiment. Zone coordinator 402 can be any zone coordinator in BMS 300 (e.g., one of zone coordinators 306-310 or 318). In FIG. 5, zone coordinator 402 is shown as a Verasys COBP engine (VCE) connected with a COBP zoning system via a zone bus 430. The COBP zoning system is shown to include a COBP RTU 502, a bypass damper 504, and a zone controller 506. However, zone coordinator 402 can also function as a Verasys VAV engine (VVE) if connected with a VVE zoning system via zone bus 430. For example, COBP RTU 502 can be replaced with a VAV RTU and bypass damper 504 can be removed to allow zone coordinator 402 to function as a VVE. A single model of zone coordinator 402 can be configured to handle multiple different types of zoning systems (e.g., a VAV zoning system, a COBP zoning system, etc.).

Zone coordinator 402 is shown to include a system bus datalink 514, a zone bus datalink 510, and a processing circuit 518. System bus datalink 514 may be the same or similar to system bus datalink 412, as described with reference to FIG. 4. For example, system bus datalink 514 can be used to communicate with system manager 302, NAE 320, and/or any other system or device connected to system bus 354 (e.g., CVRTU 312, IOM 314, thermostat controller 316, etc.). System bus datalink 514 is shown to include an active node table 516. Active node table 516 provides status information for the devices connected to system bus 354. For example, active node table 516 can indicate which MSTP devices are participating in the token ring used to exchange information via system bus 354.

Similarly, zone bus datalink 510 can be used to communicate with COBP RTU 502, bypass damper 504, zone controller 506, and/or any other devices connected to zone bus 430. Zone bus datalink 510 is shown to include an active node table 512. Active node table 512 provides status information for the devices connected to zone bus 430. For example, active node table 512 can indicate which MSTP devices are participating in the token ring used to exchange information via zone bus 430. In some embodiments, active node table 512 is a table in the form of an array of bytes. The location of each byte in active node table 512 may represent the token ring participation status of a particular node or device connected to zone bus 430. Devices connected to zone bus 430 can be identified by MAC address (or any other device identifier) in active node table 512. Advantageously, active node table 512 can list the MAC addresses of the devices connected to zone bus 430 without requiring the devices to be placed in discovery mode.

In some embodiments, active node table 512 includes a change counter attribute. Each time a change to active node table 512 occurs (e.g., a new device begins communicating on zone bus 430), the change counter attribute can be incremented by zone bus datalink 510. Other objects or devices interested in the status of active node table 512 can subscribe to a change of value (COV) of the change counter attribute. When the change counter attribute is incremented, zone bus datalink 510 can report the COV to any object or device that has subscribed to the COV. For example, detector object 522 can subscribe to the COV of the change counter attribute and can be automatically notified of the COV when a change to active node table 512 occurs. In response to receiving the COV notification, detector object 522 can read active node table 512. Detector object 522 can use the information from active node table 512 to generate a list of devices connected to zone bus 430. Detector object 522 is described in greater detail below.

Still referring to FIG. 5, processing circuit 518 is shown to include a processor 520 and memory 508. Processor 520 can be a general purpose or specific purpose processor, an application specific integrated circuit (ASIC), one or more field programmable gate arrays (FPGAs), a group of processing components, or other suitable processing components. Processor 520 is configured to execute computer code or instructions stored in memory 508 or received from other computer readable media (e.g., CDROM, network storage, a remote server, etc.).

Memory 508 can include one or more devices (e.g., memory units, memory devices, storage devices, etc.) for storing data and/or computer code for completing and/or facilitating the various processes described in the present disclosure. Memory 508 can include random access memory (RAM), read-only memory (ROM), hard drive storage, temporary storage, non-volatile memory, flash memory, optical memory, or any other suitable memory for storing software objects and/or computer instructions. Memory 508 can include database components, object code components, script components, or any other type of information structure for supporting the various activities and information structures described in the present disclosure. Memory 508 can be communicably connected to processor 520 via processing circuit 518 and can include computer code for executing (e.g., by processor 520) one or more processes described herein. When processor 520 executes instructions stored in memory 508, processor 520 generally configures zone coordinator 402 (and more particularly processing circuit 518) to complete such activities.

Still referring to FIG. 5, zone coordinator 402 is shown to include a detector object 522. Detector object 522 is configured to detect equipment connected to zone bus 430. In some embodiments, detector object 522 maintains a device list 524 that system manager 302 uses to construct a device tree. Detector objet 522 can generate the device list using information from active node table 512. For example, detector object 522 can sign up or subscribe to a change in value (COV) of the change counter attribute of active node table 512. When a change to active node table 512 occurs, zone bus datalink 510 can provide a COV notification to detector object 522. In response to receiving the COV notification, detector object 522 can read active node table 512. Detector object 522 can use the information from active node table 512 to generate a list of devices connected to zone bus 430. Zone bus device list 524 can be stored in zone coordinator 402.

Zone bus device list 524 can provide information about each of the devices that are currently connected to zone bus 430. In some embodiments, zone bus device list 524 specifies whether system manager 302 should talk directly to each connected zone bus device, or whether system manager 302 should communicate with zone coordinator 402 to interact with the zone bus device. In some embodiments, zone bus device list 524 specifies that system manager 302 should communicate directly with devices that store their own equipment model, but should communicate with zone coordinator 402 to interact with devices having equipment models stored within zone coordinator 402. In some embodiments, zone bus device list 524 stores detailed information for devices that have equipment models stored within zone coordinator 402. For example, zone bus device list 524 can store a user name, description, MAC address, online/offline status, number of active critical alarms, an equipment view version, a top level equipment model, a view definition, and/or model attributes for one or more connected zone bus devices.

Zone bus device list 524 can specify the network address of each connected zone bus device. In some embodiments, the zone bus device list stores a null network address (e.g., network address=0) for a connected zone bus device if the equipment model for the zone bus device is stored within zone coordinator 402. However, if the zone bus device stores its own equipment model, the actual network address of the zone bus device can be provided in zone bus device list 524. System manager 302 can read zone bus device list 524 and use the network address obtained from zone bus device list 524 to communicate directly with connected zone bus devices.

Detector object 522 can communicate with connected zoning system devices in response to a determination that a change to active node table 512 has occurred (e.g., a COV notification from zone bus datalink 510). Upon receiving the COV notification from zone bus datalink 510, detector object 522 can read model attributes of the various zoning system devices coordinated by zone coordinator 402. Such devices can include zone bus devices connected to zone bus 430. For example, detector object 522 can read model attributes from a wired zone controller 506, bypass damper 504, COBP RTU 502, and/or any other device connected to zone bus 430. Detector object 522 can also read model attributes from other zoning system devices, which can be connected to zone coordinator 402 via a wired or wireless communications link. For example, detector object 522 can read model attributes from a Zigbee coordinator device, a wireless zone controller, or any other zoning system device. Detector object 522 can use the model attributes to populate the information stored in zone bus device list 524.

In some embodiments, detector object 522 is configured to provide COV notifications to system manager 302 when zone bus device list 524 is updated. For example, system manager 302 can subscribe to changes in zone bus device list 524 maintained by detector object 522. When zone bus device list 524 changes, detector object 522 can notify system manager 302 of the change. In response to receiving a COV notification from detector object 522, system manager 302 can read zone bus device list 524 from zone coordinator 402. System manager 302 can then use the updated zone bus device list 524 to update the master device list stored in system manager 302 (e.g., in device list storage 424).

In some embodiments, detector object 522 compares the updated zone bus device list 524 with a previous version of zone bus device list 524 when an update to zone bus device list 524 occurs. If a MAC address was added to zone bus device list 524, detector object 522 can create or update an equipment object corresponding to the MAC address (e.g., a zone controller equipment object 582, a bypass damper equipment object 572, etc.). If a MAC address was deleted from zone bus device list 524, detector object 522 can remove the corresponding equipment object or can take no action. If an equipment model has changed for an existing MAC address in zone bus device list 524, detector object can delete and re-add the associated equipment object. Detector object 522 can merge the updates to zone bus device list 524 into the previous version of zone bus device list 524 and can update the online/offline status for each zone bus device. In some embodiments, detector object 522 deletes offline devices in response to receiving a relearn command from system manager 302.

Still referring to FIG. 5, zone coordinator 402 is shown to include a zone coordinator equipment model 550 having a zone coordinator equipment object 552. Zone coordinator equipment object 552 can configure connected zone bus devices. For example, when zone coordinator 402 receives an update to a time zone parameter or unit set parameter, zone coordinator equipment object 552 can pass the updated values to each of the zone bus devices. In some embodiments, zone coordinator equipment object 552 receives an updated value for the RTU type attribute of COBP RTU 502. The updated value can be received from a user or read from the model attributes of COBP RTU 502. Zone coordinator equipment object 552 can determine whether the updated RTU type is compatible with zone controller 506. If the RTU type is not compatible, zone coordinator equipment object 552 can remove details from zone controller equipment model 580 so that minimal details are shown via the web interface. In some embodiments, zone coordinator equipment object 552 receives a relearn command from system manager 302 and commands detector object 522 to delete offline system bus devices in response to receiving the relearn command.

Zone coordinator 402 is shown to include a bypass damper equipment model 570 and a zone controller equipment model 580. Bypass damper equipment model 570 and zone controller equipment model 580 represent bypass damper 504 and zone controller 506, respectively. Although only one zone controller equipment model 580 is shown in FIG. 5, it should be understood that any number of zone controller equipment objects can be included, based on the number of zone controllers connected to zone coordinator 402 via zone bus 430. For example, if two zone controllers are connected to zone bus 430, zone coordinator 402 can include two zone controller equipment models (i.e., one zone controller equipment model for each zone controller).

Equipment models 570 and 580 can include a set of data points or attributes that define bypass damper 504 and zone controller 506. Zone coordinator 402 can interact with bypass damper 504 and zone controller 506 by reading and writing values to equipment models 570 and 580. In some embodiments, equipment models 570 and 580 are created automatically by zone coordinator 402. For example, zone controller equipment model 580 can be created or deleted by detector object 522 when zone controller 506 is added or removed from the network.

Bypass damper equipment model 570 is shown to include a damper equipment object 572. Similarly, zone controller equipment model 580 is shown to include a controller equipment object 582. Equipment objects 572 and 582 can communicate with bypass damper 504 and zone controller 506 via zone bus 430. For example, damper equipment object 572 can receive data from bypass damper 504 and update bypass damper equipment model 570 with the data values from bypass damper 504. Similarly, zone controller equipment object 582 can receive data from zone controller 506 and can update zone controller equipment model 580 with the data values from zone controller 506. Equipment objects 572 and 582 can also send data to bypass damper 504 and zone controller 506 based on the data values stored in equipment models 570 and 580.

Equipment objects 572 and 582 can create BACnet objects for damper 504 and zone controller 506. For example, equipment objects 572 and 582 can create BACnet analog value (AV) objects 532, BACnet binary value (BV) objects 534, and/or BACnet multistate value (MV) objects 536 representing various data points defined by equipment models 570 and 580. The BACnet objects 532-536 created by equipment objects 572 and 582 can be stored in BACnet layer 530 and exposed to system bus devices (e.g., system manager 302) via system bus 354. System manager 302 can interact with bypass damper 504 and zone controller 506 by reading and writing data values to BACnet objects 532-536. Equipment objects 572 and 582 can be configured to synchronize BACnet objects 532-536 with the data values stored in equipment models 570 and 580 to bridge communications between system manager 302 and zone bus devices such as bypass damper 504 and zone controller 506.

In some embodiments, zone controller equipment object 582 can sign up or subscribe to a COV of a SA device list maintained by zone controller 506. SA devices can include any device connected to zone controller 506 via a sensor/actuator (SA) bus (e.g., SA bus 366). Zone controller 506 can maintain a list of the SA devices connected to the SA bus in the same way that zone coordinator 402 maintains the list of zone bus devices connected to zone bus 430. In some embodiments, the list of SA bus devices maintained by zone controller 506 includes a change counter attribute. When a change to the list of SA bus devices occurs, zone controller 506 can provide a COV notification to zone controller equipment object 582. In response to receiving the COV notification, zone controller equipment object 582 can read the list of SA bus devices maintained by zone controller 506 to identify the devices connected to zone controller 506 via the SA bus.

Zone controller equipment object 582 can use the list of SA bus devices to update zone bus device list 524. For example, zone bus device list 524 can be updated to include the list of SA bus devices associated with each zone controller in the zone bus device list. As described above, system manager 302 can use the zone bus device list 524 to update the list of devices in BMS 300. In this way, the list of devices can be updated to include hierarchical information with system bus devices at a first level of the hierarchy, zone bus devices at a second level of the hierarchy (e.g., hierarchically below each zone coordinator in the list of system bus devices), and SA bus devices at a third level of the hierarchy (e.g., hierarchically below each zone controller in the list of system bus devices).

Still referring to FIG. 5, zone coordinator 402 is shown to include an RTU object 560. RTU object 560 represents COBP RTU 502. In some embodiments, RTU 502 stores its own equipment model within RTU 502. Accordingly, RTU object 560 may not include an equipment model for RTU 502. However, RTU object 560 can behave like an equipment object. For example, RTU object 560 can create a set of BACnet objects for RTU 502. The set of BACnet objects created by RTU object 560 can be a subset of the BACnet objects exposed directly by RTU 502 on zone bus 430 and can be stored in BACnet layer 530. The BACnet objects created by RTU object 560 provides a local representation of RTU 502 within zone coordinator 402. The BACnet objects created by RTU object 560 can be exposed to system manager 302 and other system bus devices via system bus 354.

In some embodiments, zone coordinator equipment model 550, bypass damper equipment model 570, and zone controller equipment model 580 include trend logs 554, 574, and 584. Trend logs 554, 574, and 584 can store trend data for various data points associated with zone coordinator equipment object 552, bypass damper equipment object 572, and zone controller equipment object 582. Similarly, RTU object 560 can cache data from RTU 502 for use by other objects within zone coordinator 402.

In some embodiments, zone controller equipment object 582 and trend logs 554, 574, and 584 are created/deleted at runtime and may not be part of the provisioned archive. For example, zone controller equipment object 582 can be created in response to a determination by detector object 522 that a new zone controller 506 is connected to zone bus 430. Zone controller equipment object 582 can be deleted by detector object 522 is the corresponding zone controller is offline or disconnected when a relearn command is received by the zone coordinator 402.

In some embodiments, zone controller equipment object 582 and trend logs 554, 574, and 584 are archived at runtime in a separate archive file. Detector object 522 can initiate the archive process when a zone is added or deleted. In some embodiments, the archive process only archives zone objects and trend log objects. During subsequent startups, this separate archive can be loaded immediately after the provisioned archive is loaded. Persisted values and trend samples from the separate archive can be retrieved and applied during normal operation. In some embodiments, the provisioning manager 526 does not delete or replace the separate archive during provisioning.

Still referring to FIG. 5, zone coordinator 402 is shown to include logic objects 538 and a group object 540. Group object 540 can maintain a list of the zones managed by zone coordinator 402. In some embodiments, the zone list is automatically updated when zones are added or deleted. For example, zone controller equipment object 582 can be configured to automatically add a zone to the zone list when zone controller equipment model 580 is created. In some embodiments, group object 540 distributes commands or data to the listed zones. For example, group object 540 can receive an occupancy command or occupancy data (e.g., from logic objects 538) and can distribute the occupancy command or occupancy data to the various zone controllers connected to zone bus 430.

Logic objects 538 can interact with the collection of zones and the zoning system. Logic objects 538 can retrieve the zone list from group object 540 and perform logic on the collection. Each logic object 538 can have different functionality. For example, logic objects 538 can be configured to perform zone control (e.g. zoning system balancing, mode selection, shutdown determination, system mode determination, etc.), reset control (e.g., discharge air temperature setpoint reset, duct pressure setpoint reset, etc.), occupancy determination, data processing (e.g., data tagging, outlier detection, etc.), fault detection, or other logic-based functions.

In some embodiments, logic objects 538 are configured to perform weighted voting for the zones listed by group object 540. Different building zones can have different conditions (e.g., different air temperatures, different setpoints, etc.) and therefore may require different control actions to be performed. For example, one building zone may require heating, whereas another building zone may require cooling. If multiple building zones are served by a single RTU, zone coordinator 402 can determine whether the RTU should operate in a heating mode (e.g., providing warm air) or a cooling mode (e.g., providing chilled air) to serve the connected building zones. Zone coordinator 402 can determine which control action to provide based on votes provided by each zone controller.

Each zone's vote can have an associated weight (e.g., from zero to three) that reflects the zone's importance. For example if a zone has a weight of three, it can vote three times, whereas a zone with a weight of one can only vote one time. A weight of zero may indicate that the zone does not vote. Zone controller equipment model 580 can include the weight associated with the zone controlled by zone controller 506. Other zone controller equipment models stored within zone coordinator 402 can include weights for other zones managed by zone coordinator 402 (e.g., if multiple zone controllers are connected to zone bus 430). A user can modify the zone weights through system manager 302. Zone coordinator 402 can use the weights and the votes provided by each zone controller to determine how to best operate the RTU that serves the building zones.

Automatic Equipment Discovery and Equipment Model Distribution

Figure 6:
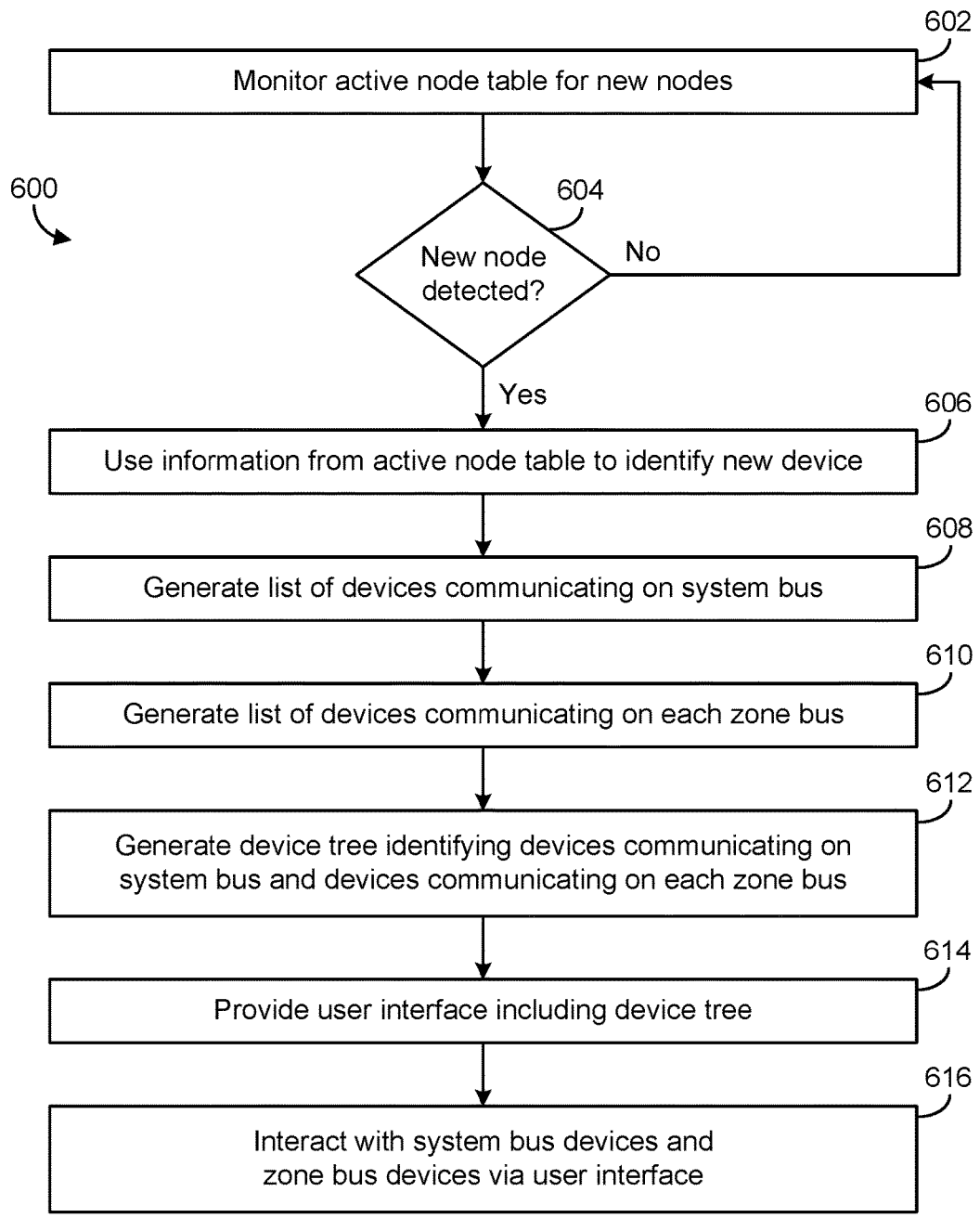
FIG. 6 is a flow diagram illustrating a technique which can be used by the BMS of FIGS. 2A-2B to automatically discover and interact with BMS equipment, according to some embodiments.

Referring now to FIG. 6, a flowchart of a process 600 for automatically discovering and interacting with equipment in a building management system is shown, according to an exemplary embodiment. Process 600 can be performed by one or more components of BMS 300. In some embodiments, process 600 is be performed by system manager 302 and/or zone coordinator 402 as described with reference to FIGS. 3-5. Process 600 can be used to automatically discover devices communicating on system bus 354, any of zone busses 356-360 and 364, and/or SA bus 366. Once the devices have been discovered, process 600 can be used to generate a user interface (e.g., a web interface) which provides information about the devices and allows a user to monitor and control the devices.

Process 600 is shown to include monitoring an active node table for new nodes (step 602). In some embodiments, step 602 is performed by system manager 302. For example, system manager 302 can monitor active node table 414 for new nodes. Each node in active node table 414 can represent a device communicating on system bus 354. In some embodiments, system manager 302 monitors active node table 414 for new nodes by subscribing to a change of value (COV) of a change counter attribute for active node table 414. Each time a change to active node table 414 occurs (e.g., a new device begins communicating on system bus 354), the change counter attribute can be incremented by system bus datalink 412. When the change counter attribute is incremented, system bus datalink 412 can report the COV to device list generator 428.

In some embodiments, step 602 is performed by zone coordinator 402. For example, zone coordinator 402 can monitor active node table 512 for new nodes. Each node in active node table 512 can represent a device communicating on zone bus 430. In some embodiments, zone coordinator 402 monitors active node table 512 for new nodes by subscribing to COV of a change counter attribute for active node table 512. Each time a change to active node table 512 occurs (e.g., a new device begins communicating on zone bus 430), the change counter attribute can be incremented by zone bus datalink 510. When the change counter attribute is incremented, zone bus datalink 510 can report the COV to detector object 522.

In some embodiments, step 602 is performed by a zone controller (e.g., zone controller 506). For example, zone controller 506 can monitor an active node table within a SA bus datalink for new nodes. The SA bus datalink can be used by zone controller 506 to communicate on a SA bus (e.g., SA bus 366). Each node in the active node table for the SA bus datalink can represent a device communicating on the SA bus. In some embodiments, zone controller 506 monitors the active node table for new nodes by subscribing to COV of a change counter attribute for the active node table. Each time a change to the active node table occurs (e.g., a new device begins communicating on the SA bus), the change counter attribute can be incremented by the SA bus datalink. When the change counter attribute is incremented, the SA bus datalink can report the COV to zone controller 506.

In some embodiments, system manager 302 monitors the active node table 414 within system bus datalink 412 for new nodes. However, system manager 302 can also monitor the active node table 512 within zone bus datalink 510 and/or the active node table within the SA bus datalink for new nodes. For example, zone bus datalink 510 can send COV notifications to system manager 302 when a change to active node table 512 occurs. Similarly, zone controller 506 can send COV notifications to system manager 302 when a change to the active node table for the SA bus occurs. In this way, system manager 302 can monitor not only the active node table 414 within system bus datalink 412, but also the active node tables within zone bus datalink 510 and the SA bus datalink.

Still referring to FIG. 6, process 600 is shown to include determining whether a new node is detected (step 604). In some embodiments, step 604 is performed by system manager 302. For example, device list generator 428 can read active node table 414 in response to receiving a COV notification indicating that active node table 414 has been updated. Device list generator 428 can compare the data from active node table 414 to a previous (e.g., cached) version of active node table 414 to determine whether any new nodes have been added. If a new node has been added to active node table 414, device list generator 428 can determine that a new node is detected (i.e., the result of step 604 is "yes") and process 600 can proceed to step 606. If a new node has not been added, process 600 can return to step 602.

In some embodiments, step 604 is performed by zone coordinator 402. For example, detector object 522 can read active node table 512 in response to receiving a COV notification indicating that active node table 512 has been updated. Detector object 522 can compare the data from active node table 512 to a previous (e.g., cached) version of active node table 512 to determine whether any new nodes have been added. If a new node has been added to active node table 512, detector object 522 can determine that a new node is detected (i.e., the result of step 604 is "yes") and process 600 can proceed to step 606. If a new node has not been added, process 600 can return to step 602.

In some embodiments, step 604 is performed by zone controller 506. For example, zone controller 506 can read the active node table for the SA bus in response to receiving a COV notification indicating that the active node table for the SA bus has been updated. Zone controller 506 can compare the data from the active node table to a previous (e.g., cached) version of the active node table to determine whether any new nodes have been added. If a new node has been added to the active node table for the SA bus, zone controller 506 can determine that a new node is detected (i.e., the result of step 604 is "yes") and process 600 can proceed to step 606. If a new node has not been added, process 600 can return to step 602.

Still referring to FIG. 6, process 600 is shown to include using information from the active node table to identify the new device (step 606). In some embodiments, step 606 is performed by system manager 302. For example, device list generator 428 can use address information (e.g., MAC addresses, network addresses, etc.) from active node table 414 to send a request for information to a new system bus device. The request can include a request for an equipment model stored within the new system bus device and/or a request for point values provided by the new system bus device (e.g., a get device tree request). In response to the request, the new system bus device may provide information that can be used to identify the device (e.g., device type, model number, types of data points, etc.). System manager 302 can identify the new system bus device based on such information.

In some embodiments, step 606 is performed by zone coordinator 402. For example, detector object 522 can use address information (e.g., MAC addresses, network addresses, etc.) from active node table 512 to send a request for information to a new zone bus device. The request can include a request for an equipment model stored within the new zone bus device and/or a request for point values provided by the new zone bus device (e.g., a get device tree request). In response to the request, the new zone bus device may provide information that can be used to identify the device (e.g., device type, model number, types of data points, etc.). Zone coordinator 402 can identify the new zone bus device based on such information.

In some embodiments, step 606 is performed by zone controller 506. For example, zone controller 506 can use address information (e.g., MAC addresses, network addresses, etc.) from the active node table for the SA bus to send a request for information to a new SA bus device. The request can include a request for an equipment model stored within the new SA bus device and/or a request for point values provided by the new SA bus device (e.g., a get device tree request). In response to the request, the new SA bus device may provide information that can be used to identify the device (e.g., device type, model number, types of data points, etc.). Zone controller 506 can identify the new SA bus device based on such information.

Still referring to FIG. 6, process 600 is shown to include generating a list of devices communicating on the system bus (step 608) and generating a list of devices communicating on each zone bus (step 610). Step 608 can be performed by device list generator 428 using information obtained from active node table 414 and/or information received from identified system bus devices. Similarly, step 610 can be performed by each zone coordinator 402 using information obtained from active node table 512 and/or information received from identified zone bus devices. In some embodiments, step 610 includes providing the lists of zone bus devices from each zone coordinator 402 to system manager 302.

Process 600 is shown to include generating a device identifying devices communicating on the system bus and devices communicating on each zone bus (step 612). In some embodiments, step 612 is performed by system manager 302. For example, system manager 302 can use the lists of zone bus devices from each zone coordinator 402 to construct the device tree. The device tree can be a hierarchy of devices in BMS 300. For example, the list of system bus devices can be updated to include the list of field devices associated with each zone coordinator hierarchically below the associated zone coordinator in the system bus device list. In this way, the combined list of devices (i.e., the device tree) can include hierarchical information with system bus devices at a first level of the hierarchy and zone bus devices at a lower level of the hierarchy (e.g., hierarchically below the corresponding zone coordinator in the list of system bus devices).

Process 600 is shown to include providing a user interface including the device tree (step 614). In some embodiments, step 614 is performed by web server 416 and/or user interface client 418 of system manager 302. For example, web server 416 can use the device tree generated in step 612 to build a web interface. In some embodiments, web server 416 uses a view definition for each device in the device list to determine which attributes of the devices to include in the web interface. In some embodiments, web server 416 generates a home page for each type of equipment based on a home page view definition for the equipment type. The home page view definition can be stored in system manager 302 (e.g., in view definition storage). Other view definitions can be stored in system manager 302 or received from other devices at runtime.

Process 600 is shown to include interacting with the system bus devices and the zone bus devices via the user interface (step 616). Step 616 can include accessing the equipment models for the system bus devices and the zone bus devices to obtain data values for display in the user interface. In some embodiments, step 616 includes receiving input from a user via the user interface. The user input can change an attribute of a device (e.g., device name, setpoint, device type, etc.) presented in the user interface. System manager 302 can use the updated value of the device attribute to update the value in the equipment model for the device and/or to provide a control signal to the device. In some embodiments, step 616 includes providing the updated value to zone coordinator 402 and/or zone controller 506 (e.g., if the equipment model for the device is stored in zone coordinator 402 or zone controller 506).

Referring now to FIG. 7, a flowchart of a process 700 for automatically creating and using equipment models for system bus devices is shown, according to an exemplary embodiment. Process 700 can be performed by one or more components of system manager 302, as described with reference to FIGS. 3-4. In some embodiments, process 700 is performed by system manager 302 when a new system device is detected.

Process 700 is shown to include identifying a new device communicating on the system bus (step 702). Step 702 can be the same or similar to step 606 of process 600. For example, step 702 can include using address information (e.g., MAC addresses, network addresses, etc.) from active node table 414 to send a request for information to a new system bus device. The request can include a request for an equipment model stored within the new system bus device and/or a request for point values provided by the new system bus device (e.g., a get device tree request). In response to the request, the new system bus device may provide information that can be used to identify the device (e.g., device type, model number, types of data points, etc.). System manager 302 can identify the new system bus device based on such information.

Process 700 is shown to include determining whether the new system bus device includes an equipment model (step 704). Some devices in BMS 300 present themselves to system manager 302 using equipment models. An equipment model can define equipment object attributes, view definitions, schedules, trends, and the associated BACnet value objects (e.g., analog value, binary value, multistate value, etc.) that are used for integration with other systems. Some system bus devices store their own equipment models (e.g., zone coordinators 306-310 and 318, CVRTU 312, thermostat controller 316). Other devices in BMS 300 do not store their own equipment models (e.g., IOM 314, third party controller 320, etc.). Step 704 can include sending a request for an equipment model to the new system bus device or reading a list of point values provided by the new system bus device. If the new system bus device includes an equipment model, the system bus device may present an equipment model to system manager 302 in response to the request.

If the system bus device includes an equipment model (i.e., the result of step 704 is "yes"), system manager 302 can read the equipment model from the system bus device (step 706). Since the equipment model is already stored within the system bus device, the equipment model can be retained within the system bus device (step 708). However, if the system bus device does not include an equipment model (i.e., the result of step 704 is "no"), system manager 302 can automatically generate a new equipment model for the system bus device (step 710). In some embodiments, system manager 302 retrieves a list of point values provided by the device and uses the list of point values to create a new equipment model for the device. The new equipment model can be stored within system manager 302 (step 712).

Process 700 is shown to include interacting with the system bus device via the equipment model (step 714). Step 714 can include reading data values from the equipment model and writing data values to the equipment model. If the equipment model is stored in the system bus device, step 714 can include interacting directly with the system bus device. However, if the equipment model is stored in system manager 302, step 714 can include interacting with system manager 302. System manager 302 can then interact with the system bus device. System manager 302 can provide a user interface for any system bus device using the equipment models stored within the system bus devices and/or the equipment models created by system manager 302. In some embodiments, system manager 302 stores a view definition for each type of equipment connected via system bus 354 and uses the stored view definition to generate a user interface for the equipment.

Referring now to FIG. 8, a flowchart of a process 800 for automatically creating and using equipment models for zone bus devices is shown, according to an exemplary embodiment. Process 800 can be performed by one or more components of zone coordinator 402, as described with reference to FIGS. 3-5. In some embodiments, process 800 is performed by zone coordinator 402 when a new zone bus device is detected.

Process 800 is shown to include identifying a new device communicating on the zone bus (step 802). Step 802 can be the same or similar to step 606 of process 600. For example, step 802 can include using address information (e.g., MAC addresses, network addresses, etc.) from active node table 512 to send a request for information to a new zone bus device. The request can include a request for an equipment model stored within the new zone bus device and/or a request for point values provided by the new zone bus device (e.g., a get device tree request). In response to the request, the new zone bus device may provide information that can be used to identify the device (e.g., device type, model number, types of data points, etc.). Zone coordinator 402 can identify the new zone bus device based on such information.

Process 800 is shown to include determining whether the new zone bus device includes an equipment model (step 804). Some devices in BMS 300 present themselves to zone coordinator 402 using equipment models. An equipment model can define equipment object attributes, view definitions, schedules, trends, and the associated BACnet value objects (e.g., analog value, binary value, multistate value, etc.) that are used for integration with other systems. Some zone bus devices store their own equipment models (e.g., supported RTUs). Other zone bus devices do not store their own equipment models (e.g., bypass damper 504, zone controller 506). Step 804 can include sending a request for an equipment model to the new zone bus device or reading a list of point values provided by the new zone bus device. If the new zone bus device includes an equipment model, the zone bus device may present an equipment model to zone coordinator 402 in response to the request.

If the zone bus device includes an equipment model (i.e., the result of step 804 is "yes"), zone coordinator 402 can read the equipment model from the zone bus device (step 806). Since the equipment model is already stored within the zone bus device, the equipment model can be retained within the zone bus device (step 808). However, if the zone bus device does not include an equipment model (i.e., the result of step 804 is "no"), zone coordinator 402 can automatically generate a new equipment model for the zone bus device (step 810). In some embodiments, zone coordinator 402 retrieves a list of point values provided by the device and uses the list of point values to create a new equipment model for the device. The new equipment model can be stored within zone coordinator 402 (step 812).

Process 800 is shown to include interacting with the zone bus device via the equipment model (step 814). Step 814 can include reading data values from the equipment model and writing data values to the equipment model. If the equipment model is stored in the zone bus device, step 814 can include interacting directly with the zone bus device. For example, system manager 302 can communicate directly with a zone bus device that stores its own equipment model. However, if the equipment model is stored in zone coordinator 402, step 814 can include interacting with zone coordinator 402. Zone coordinator 402 can then interact with the zone bus device.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
  a system manager comprising a first system bus datalink having a first active node table stored therein;
  a zone coordinator comprising a second system bus datalink and a zone bus datalink;
  a system bus connecting the first system bus datalink to the second system bus datalink;
  one or more zone controllers, each zone controller configured to monitor and control a building zone; and
  a zone bus connecting the zone bus datalink to the one or more zone controllers;

wherein a plurality of system bus devices, including the system manager and the zone coordinator, communicate on the system bus using a master-slave token passing protocol;

wherein the first active node table comprises a plurality of nodes, each node representing one of the system bus devices participating in a token passing ring used to exchange information among the system bus devices using the master-slave token passing protocol via the system bus;

wherein the system manager is configured to monitor the first active node table for new nodes and to identify a new system bus device communicating on the system bus in response to a determination that the first active node table includes a new node.

2. The building management system of claim 1, wherein:
the first active node table comprises a first table change counter;
the first system bus datalink is configured to increment the first table change counter when a change to the first active node table occurs; and
the system manager is configured to read the first active node table in response to a change of value (COV) of the first table change counter.

3. The building management system of claim 1, wherein the system manager comprises a device list generator configured to use information from the first active node table to generate a device list identifying system bus devices communicating on the system bus.

4. The building management system of claim 3, wherein:
the zone coordinator is configured to maintain a list of zone bus devices communicating on the zone bus and to provide the list of zone bus devices to the system manager; and
the system manager is configured to generate a device tree comprising both the system bus devices communicating on the system bus and the zone bus devices communicating on the zone bus.

5. The building management system of claim 4, wherein:
each zone controller is connected to a sensor/actuator (SA) bus and configured to maintain a list of SA bus devices communicating on the SA bus;
the zone coordinator is configured to obtain the list of SA bus devices from each zone controller and provide the list of SA bus devices to the system manager; and
the system manager is configured to update the device tree to include the system bus devices communicating on the system bus, the zone bus devices communicating on the zone bus, and the SA bus devices communicating on the SA bus.

6. The building management system of claim 1, wherein the system manager is configured to automatically identify the new system bus device without requiring the new system bus device to be placed in discovery mode and without sending a discovery command to the new system bus device.

7. The building management system of claim 1, wherein the zone bus datalink has a second active node table stored therein, the second active node table comprising a plurality of nodes, each node of the second active node table representing a zone bus device communicating on the zone bus.

8. The building management system of claim 7, wherein the zone coordinator is configured to monitor the second active node table for new nodes and to identify a new zone bus device communicating on the zone bus in response to a determination that the second active node table includes a new node.

9. The building management system of claim 1, wherein the system manager is configured to retrieve an equipment model from the new system bus device and to generate a user interface comprising one or more point values identified by the equipment model.

10. The building management system of claim 1, wherein the system manager is configured to:
determine whether the new system bus device provides its own equipment model;
automatically generate a new equipment model for the new system bus device in response to a determination that the new system bus device does not provide its own equipment model; and
store the new equipment model within the system manager.

11. The building management system of claim 1, wherein the zone coordinator is configured to:
identify one or more zone bus devices communicating on the zone bus;
determine whether each of the identified zone bus devices provides its own equipment model;
automatically generate a new equipment model for an identified zone bus device that does not provide its own equipment model; and
store the new equipment model within the zone coordinator.

12. The building management system of claim 1, wherein the system manager is configured to:
identify one or more zone bus devices communicating on the zone bus;
determine whether each of the identified zone bus devices provides its own equipment model;
communicate directly with each zone bus device that provides its own equipment model; and
communicate with the zone coordinator to interact with each zone bus device that does not provide its own equipment model.

13. A method for discovering equipment in a building management system, the method comprising:
monitoring a first active node table for new nodes, each node representing a system bus device participating in a token passing ring used to exchange information among a plurality of system bus devices via a system bus, wherein the plurality of system bus devices communicate on the system bus using a master-slave token passing protocol;
identifying a new system bus device communicating on the system bus in response to a determination that the first active node table includes a new node;
determining whether the new system bus device provides its own equipment model;
retrieving the equipment model from the new system bus device in response to a determination that the new system bus device provides its own equipment model; and
automatically generating a new equipment model for the new system bus device in response to a determination that the new system bus device does not provide its own equipment model.

14. The method of claim 13, wherein identifying the new system bus device comprises:
incrementing a first table change counter when a change to the first active node table occurs; and
reading the first active node table in response to a change of value (COV) of the first table change counter.

15. The method of claim 13, further comprising using information from the first active node table to generate a device list identifying system bus devices communicating on the system bus.

16. The method of claim 15, further comprising:
maintaining a list of zone bus devices communicating on a zone bus separate from the system bus; and
generating a device tree comprising both the system bus devices communicating on the system bus and the zone bus devices communicating on the zone bus.

17. The method of claim 16, further comprising:
maintaining a list of sensor/actuator (SA) bus devices communicating on a SA bus separate from the system bus and the zone bus; and
updating the device tree to include the system bus devices communicating on the system bus, the zone bus devices communicating on the zone bus, and the SA bus devices communicating on the SA bus.

18. The method of claim 13, wherein the equipment model comprises a plurality of point objects that provide information about the new system bus device and store present values of variables or parameters used by the new system bus device.

19. The method of claim 13, further comprising:
monitoring a second active node table for new nodes, each node of the second active node table representing a zone bus device communicating on a zone bus separate from the system bus; and
identifying a new zone bus device communicating on the zone bus in response to a determination that the second active node table includes a new node.

20. The method of claim 19, wherein:
the first active node table is stored within a system bus datalink connected to the system bus; and
the second active node table is stored within a zone bus datalink connected to the zone bus.

* * * * *